US012582098B2

(12) United States Patent
Erickson et al.

(10) Patent No.: US 12,582,098 B2
(45) Date of Patent: Mar. 24, 2026

(54) REAR-FACING POULTRY CLAW SYSTEM AND METHOD

(71) Applicant: NOVA-TECH ENGINEERING, LLC, Willmar, MN (US)

(72) Inventors: Matthew H. Erickson, Spicer, MN (US); Austin Mueller, Atwater, MN (US); JadiMarie Hopp, Hector, MN (US); Derek Worcester, Willmar, MN (US); Christopher J. Strand, Willmar, MN (US); Dominic Oerter, Sunburg, MN (US); Scott Schueler, Willmar, MN (US); Marc Zinda, Spicer, MN (US)

(73) Assignee: Nova-Tech Engineering, LLC, Willmar, MN (US)

( * ) Notice: Subject to any disclaimer, the term of this patent is extended or adjusted under 35 U.S.C. 154(b) by 0 days.

(21) Appl. No.: 18/701,421

(22) PCT Filed: Apr. 27, 2022

(86) PCT No.: PCT/US2022/026468
§ 371 (c)(1),
(2) Date: Apr. 15, 2024

(87) PCT Pub. No.: WO2023/075841
PCT Pub. Date: May 4, 2023

(65) Prior Publication Data
US 2024/0415101 A1 Dec. 19, 2024

Related U.S. Application Data

(60) Provisional application No. 63/273,423, filed on Oct. 29, 2021.

(51) Int. Cl.
*A01K 45/00* (2006.01)
*A01K 29/00* (2006.01)

(52) U.S. Cl.
CPC .............. *A01K 45/00* (2013.01); *A01K 29/00* (2013.01)

(58) Field of Classification Search
CPC ...... A01K 45/00; A01K 45/004; A01K 37/00; A01K 1/0613; A22C 21/0007;
(Continued)

(56) References Cited

U.S. PATENT DOCUMENTS 1,450,247 A * 4/1923 Carpenter .............. A01K 45/00
119/713
1,762,687 A * 6/1930 Hodges ................. A01K 45/00
119/345
(Continued)

FOREIGN PATENT DOCUMENTS

FR 2 848 410 6/2005
WO WO 2010/085718 7/2010
WO WO 2021/150842 7/2021

OTHER PUBLICATIONS

PCT International Search Report and Written Opinion for PCT/US2022/026468 dated Sep. 13, 2022 (18 pages).
(Continued)

*Primary Examiner* — Joshua J Michener
*Assistant Examiner* — Nicole Paige Maccrate
(74) *Attorney, Agent, or Firm* — Mueting Raasch Group

(57) ABSTRACT

Rear-facing poultry claw systems and methods are described herein. In one or more embodiments, the positioning systems and methods may be used to detect the claw of the rear-facing toe on one or both shanks of birds.

25 Claims, 20 Drawing Sheets

(58) Field of Classification Search
CPC ............... A22C 21/0046; A61D 1/005; A61D 2003/006; A22B 7/002
USPC ........ 119/719, 751, 752, 853; 606/279, 246, 606/163, 165, 212, 13
See application file for complete search history.

(56) References Cited

U.S. PATENT DOCUMENTS

| | | | |
|---|---|---|---|
| 2,107,484 A | | 2/1938 | Lesher |
| 3,755,854 A | | 9/1973 | Van Mil |
| 3,880,122 A | * | 4/1975 | Randolph .............. A61D 1/025 |
| | | | 452/53 |
| 3,882,570 A | | 5/1975 | Zwiep |
| 3,925,847 A | | 12/1975 | Leander |
| 4,343,309 A | | 8/1982 | DuBose |
| 4,343,310 A | | 8/1982 | DeBose |
| 4,354,297 A | | 10/1982 | Wilson |
| 4,457,048 A | | 7/1984 | Dreves |
| 4,709,448 A | | 12/1987 | McGuire |
| 5,134,971 A | * | 8/1992 | Krienke ................. A01K 45/00 |
| | | | 119/713 |
| 5,195,925 A | | 3/1993 | Gorans |
| 5,248,277 A | | 9/1993 | Bos |
| 5,282,441 A | * | 2/1994 | Ricketts ............... A01K 1/0613 |
| | | | 119/751 |
| 5,651,731 A | | 7/1997 | Gorans |
| 5,915,334 A | * | 6/1999 | Cummings .............. A61D 3/00 |
| | | | 119/757 |
| 6,461,232 B1 | | 10/2002 | Gwyther |
| 7,066,112 B2 | | 6/2006 | Gorans |
| 7,232,450 B2 | | 6/2007 | Gorans |
| 7,363,881 B2 | | 4/2008 | Gorans |
| 9,775,695 B2 | | 10/2017 | Erickson |
| 9,991,432 B2 | | 6/2018 | Erickson |
| 10,624,310 B1 | * | 4/2020 | Daniels .................... A61D 3/00 |
| 2002/0102934 A1 | | 8/2002 | Gwyther |
| 2005/0101937 A1 | | 5/2005 | Gorans |
| 2011/0313409 A1 | | 12/2011 | Erickson |
| 2012/0012070 A1 | | 1/2012 | Gorans |
| 2015/0208677 A1 | * | 7/2015 | Ostergaard ......... A22C 21/0046 |
| | | | 452/188 |
| 2019/0076228 A1 | * | 3/2019 | Kober .................. A61B 6/0428 |
| 2019/0239482 A1 | * | 8/2019 | Peacock Gallagher .. A61D 7/00 |

OTHER PUBLICATIONS

Preliminary Report on Patentability for PCT/US2022/026468 dated May 10, 2024 (13 pages).
International Search Report and Written Opinion for PCT/US2010/021901 dated Jul. 23, 2010 (11 pages).
International Preliminary Report on Patentability for PCT/US2010/021901 dated Jul. 26, 2011 (7 pages).

* cited by examiner

REAR-FACING POULTRY CLAW SYSTEM AND METHOD

RELATED APPLICATION

The application is a $371 U.S. National Stage of International Application No. PCT/US2022/026468 filed 27 Apr. 2022, which claims the benefit under 35 U.S.C. § 119 of U.S. Provisional Application Ser. No. 63/273,423, filed 29 Oct. 2021, and titled REAR-FACING POULTRY CLAW SYSTEM AND METHOD, both of which are incorporated herein by reference in their entireties.

FIELD

Rear-facing poultry claw systems and methods are described herein.

BACKGROUND

Precise positioning of poultry toes and claws is difficult due to the size and activity levels of birds. In some instances, birds are handled manually, i.e., individuals must physically hold the bird to position its toes and claws in selected locations and/or orientations. Manual handling of birds to position their toes and claws is, in addition to being difficult, also potentially dangerous to the bird.

Although carriers and other restraints designed to hold birds are known, the focus has largely been on precise positioning of beaks and bills. U.S. Pat. No. 5,651,731 (Gorans et al.) describes devices designed to restrain the heads of birds with the remainder of the bird being either manually restrained or unrestrained.

U.S. Pat. No. 9,808,328 (Gorans et al.) describes carriers designed to restrain the heads and torsos of birds, as well as their legs above the hock joint with no restraint on the shanks of the birds. U.S. Pat. No. 9,901,432 (Erickson et al.) discloses a system and method for processing the rear claw (sometimes referred to as the hind claw or anatomically identified as "phalange I") of birds restrained in, e.g., the carriers of U.S. Pat. No. 9,808,328.

SUMMARY

Rear-facing poultry claw systems and methods are described herein. In one or more embodiments, the systems and methods may be used to position and/or detect the claw of the rear-facing toe on one or both shanks of birds.

The rear-facing poultry claw systems and methods may allow for accurate detection of the claws on one or both of the rear-facing toes of poultry (such as, e.g., ducks, chickens, geese, and turkeys) where the rear-facing toes are those anatomical digits found on the shanks of birds above/proximal/superior to the distal ends of the shanks. Each shank of a bird contains the metatarsus and extends from the hock joint (sometimes referred to as the ankle joint) to the joints between the distal phalanges (sometimes referred to as the toes). The rear-facing toes on the shanks are located proximal from the distal phalanges, are commonly referred to anatomically as "phalange I" and generally face in the rearward (dorsal) direction. The rear-facing toe on each shank can be distinguished from the distal phalanges which are commonly referred to anatomically as "phalanges II, III, and IV" and extend from the distal end of the shank in a forward-facing (ventral) direction.

In one or more embodiments, the rear-facing poultry claw systems and methods may allow for simultaneous positioning of the rear-facing toes on both shanks of a bird to, for example, expedite any inspections, processing, etc. of the claws on the rear-facing toes.

In one or more embodiments, the rear-facing poultry claw systems and methods involve moving the forward-facing toes on one or both shanks in a direction towards the torso or head of the bird while restraining the shanks. Such manipulation of the forward-facing toes on a shank typically causes the rear-facing toe to extend away for the shank, thus making detection of the claw on the rear-facing toe easier and more consistent. Extension of the rear-facing toe also typically makes any inspection, processing, etc. of the claw on the rear-facing toe easier and more consistent.

In one or more embodiments, the rear-facing poultry claw systems include claw sensors that are used to deliver energy to rear-facing claws to process the rear-facing claws to retard their growth.

In a first aspect, one or more embodiments of a rear-facing poultry claw system as described herein include: a seat lift operably attached to a system frame, the seat lift configured to move between a ready position and a lift position; a toe control bar operably attached to the system frame, the toe control bar configured to move between a retracted position and a control position; a claw sensor configured to detect a claw of a rear-facing toe on a shank of a bird; a sensor track operably attached to the system frame, the sensor track defining a sensing axis, wherein the claw sensor is mounted on the sensor track and configured to move along the sensing axis between a home position and a forward position, wherein the claw sensor is closer to the toe control bar in the forward position than the home position; a seat lift actuator operably connected to the seat lift, the seat lift actuator configured to rotate the seat lift about the lift axis to move the seat lift between the ready position and the lift position; a control bar actuator operably connected to the toe control bar, the control bar actuator configured to move the toe control bar between the retracted position and the control position; a claw sensor actuator operably connected to the claw sensor, the claw sensor actuator configured to move the claw sensor along the sensing axis between the home position and the forward position; and a controller operably connected to the seat lift actuator, the control bar actuator, and the claw sensor actuator, wherein the controller is configured to: operate the seat lift actuator such that the seat lift actuator moves the seat lift from the ready position to the lift position, operate the control bar actuator such that the control bar actuator moves the toe control bar from the retracted position to the control position after operating the seat lift actuator to rotate the seat lift from the ready position to the lift position, and operate the claw sensor actuator such that the claw sensor actuator moves the claw sensor along the sensing axis from the home position to the forward position after operating the control bar actuator to move the toe control bar from the retracted position to the control position.

In one or more embodiments of rear-facing poultry claw systems described herein according to the first aspect, the seat lift is configured to rotate about a lift axis when moving between the ready position and the lift position.

In one or more embodiments of rear-facing poultry claw systems described herein according to the first aspect, the toe control bar is configured to rotate about a control bar axis when moving between the retracted position and the control position.

In one or more embodiments of rear-facing poultry claw systems described herein according to the first aspect, the system further comprises a track actuator operably attached to the sensor track, wherein the track actuator is configured to move the sensor track between a base position and a sensing position, and wherein the controller is operably connected to the track actuator, the controller being configured to operate the track actuator such that the track actuator moves the sensor track from the base position to the sensing position after operating the control bar actuator to move the toe control bar from the retracted position to the control position. In one or more embodiments, the track actuator is configured to move the sensor track between the sensing position and a finish position, wherein the controller is configured to operate the track actuator such that the sensor track actuator moves the sensor track from the sensing position to the finish position after moving the sensor track to the sensing position. In one or more embodiments, the track actuator is configured to rotate the sensor track about a track axis when moving the sensor track between the base position and the sensing position. In one or more embodiments, the lift axis is offset from one or both of the control bar axis and the track axis, and wherein, optionally, the lift axis is generally parallel to one or both of the control bar axis and track axis.

In one or more embodiments of rear-facing poultry claw systems described herein according to the first aspect, the claw sensor is selected from an RF electric field generator/ sensor, a capacitive sensor, and an optical detector.

In one or more embodiments of rear-facing poultry claw systems described herein according to the first aspect, the system comprises a poultry cradle located in a selected position relative to the system frame, wherein the poultry cradle is configured to restrain a bird such that the seat lift acts on a seat of the bird when the poultry cradle is in the selected position and the seat lift is in the lift position. In one or more embodiments, the poultry cradle comprises: a torso support shaped to support and atraumatically retain a torso of the bird restrained in the poultry cradle; a head support operably attached to the torso support and positioned to receive a head of the bird restrained in the poultry cradle with its chest supported against the torso support; a head clamp operably attached to the head support, wherein the head clamp and the head support cooperate to receive and atraumatically retain the head of the bird between the head clamp and the head support; a shank clamp operably attached to the torso support, the shank clamp positioned to receive and atraumatically retain a shank of the bird restrained in the poultry cradle, wherein the shank clamp comprises an open configuration in which the shank can be positioned in the shank clamp and a closed configuration in which the shank is retained in the shank clamp; and an optional shank guide positioned between the shank clamp and the torso support, the shank guide restraining the shank of the bird restrained in the poultry cradle from movement in the lateral and medial directions when the shank clamp is in the open configuration and the closed configuration. In one or more embodiments, a position of the shank guide relative to the torso support and the shank clamp is fixed. In one or more embodiments, a distance between an inferior/ distal/bottom side the shank clamp and an inferior/distal/ bottom side of the shank guide along a longitudinal (superior/inferior) axis extending through the head support and the torso support is 5 millimeters or more, 1 centimeter or more, or 2 centimeters or more. In one or more embodiments, the distance between an inferior/distal/bottom side the shank clamp and an inferior/distal/bottom side of the shank guide along a longitudinal (superior/inferior) axis extending through the head support and the torso support is 3 centimeters or less, 2 centimeters or less, or 1 centimeter or less. In one or more embodiments, the toe control bar is configured to act on forward-facing toes on the shank of the bird retained in the shank clamp. In one or more embodiments, the toe control bar is configured to move the forward-facing toes towards the head of the bird restrained in the poultry cradle.

In a second aspect, one or more embodiments of a rear-facing poultry claw system as described herein includes: a seat lift operably attached to a system frame, the seat lift configured to move between a ready position and a lift position; a toe control bar operably attached to the system frame, the toe control bar configured to move between a retracted position and a control position; a claw sensor configured to detect a claw of a rear-facing toe on a shank of a bird; a sensor track operably attached to the system frame, the sensor track defining a sensing axis, wherein the claw sensor is mounted on the sensor track and configured to move along the sensing axis between a home position and a forward position, wherein the claw sensor is closer to the toe control bar in the forward position than the home position, and wherein the sensor track is configured to rotate about a track axis when moving between the base position and the sensing position; a seat lift actuator operably connected to the seat lift, the seat lift actuator configured to rotate the seat lift about the lift axis to move the seat lift between the ready position and the lift position; a control bar actuator operably connected to the toe control bar, the control bar actuator configured to move the toe control bar between the retracted position and the control position; a claw sensor actuator operably connected to the claw sensor, the claw sensor actuator configured to move the claw sensor along the sensing axis between the home position and the forward position; a track actuator operably attached to the sensor track, wherein the track actuator is configured to move the sensor track between a base position and a sensing position and further configured to move the sensor track between the sensing position and a finish position; and a controller operably connected to the seat lift actuator, the control bar actuator, the track actuator, and the claw sensor actuator, wherein the controller is configured to: operate the seat lift actuator such that the seat lift actuator moves the seat lift from the ready position to the lift position, operate the control bar actuator such that the control bar actuator moves the toe control bar from the retracted position to the control position after operating the seat lift actuator to rotate the seat lift from the ready position to the lift position, operate the claw sensor actuator such that the claw sensor actuator moves the claw sensor along the sensing axis from the home position to the forward position after operating the control bar actuator to move the toe control bar from the retracted position to the control position, operate the track actuator such that the track actuator moves the sensor track from the base position to the sensing position after operating the control bar actuator to move the toe control bar from the retracted position to the control position, and operate the track actuator such that the sensor track actuator moves the sensor track from the sensing position to the finish position after moving the sensor track to the sensing position.

In one or more embodiments of rear-facing poultry claw systems described herein according to the second aspect, the seat lift is configured to rotate about a lift axis when moving between the ready position and the lift position.

In one or more embodiments of rear-facing poultry claw systems described herein according to the second aspect, the toe control bar is configured to rotate about a control bar axis when moving between the retracted position and the control position.

In one or more embodiments of rear-facing poultry claw systems described herein according to the second aspect, the seat lift is configured to rotate about a lift axis when moving between the ready position and the lift position, and wherein the toe control bar is configured to rotate about a control bar axis when moving between the retracted position and the control position. In one or more embodiments, the lift axis is offset from one or both of the control bar axis and the track axis, and wherein, optionally, the lift axis is generally parallel to one or both of the control bar axis and track axis.

In one or more embodiments of rear-facing poultry claw systems described herein according to the second aspect, the claw sensor is selected from an RF electric field generator/sensor, a capacitive sensor, and an optical detector.

In one or more embodiments of rear-facing poultry claw systems described herein according to the second aspect, wherein the system comprises a poultry cradle located in a selected position relative to the system frame, wherein the poultry cradle is configured to restrain a bird such that the seat lift acts on a seat of the bird when the poultry cradle is in the selected position and the seat lift is in the lift position. In one or more embodiments, the poultry cradle comprises: a torso support shaped to support and atraumatically retain a torso of the bird restrained in the poultry cradle; a head support operably attached to the torso support and positioned to receive a head of the bird restrained in the poultry cradle with its chest supported against the torso support; a head clamp operably attached to the head support, wherein the head clamp and the head support cooperate to receive and atraumatically retain the head of the bird between the head clamp and the head support; a shank clamp operably attached to the torso support, the shank clamp positioned to receive and atraumatically retain a shank of the bird restrained in the poultry cradle, wherein the shank clamp comprises an open configuration in which the shank can be positioned in the shank clamp and a closed configuration in which the shank is retained in the shank clamp. In one or more embodiments, the poultry cradle comprises an optional shank guide positioned between the shank clamp and the torso support, the shank guide restraining the shank of the bird restrained in the poultry cradle from movement in the lateral and medial directions when the shank clamp is in the open configuration and the closed configuration. In one or more embodiments, a position of the shank guide relative to the torso support and the shank clamp is fixed. In one or more embodiments, a distance between an inferior/distal/bottom side the shank clamp and an inferior/distal/bottom side of the shank guide along a longitudinal (superior/inferior) axis extending through the head support and the torso support is 5 millimeters or more, 1 centimeter or more, or 2 centimeters or more. In one or more embodiments, the distance between an inferior/distal/bottom side the shank clamp and an inferior/distal/bottom side of the shank guide along a longitudinal (superior/inferior) axis extending through the head support and the torso support is 3 centimeters or less, 2 centimeters or less, or 1 centimeter or less. In one or more embodiments, wherein the toe control bar is configured to act on forward-facing toes on the shank of the bird retained in the shank clamp. In one or more embodiments, the toe control bar is configured to move the forward-facing toes towards the head of the bird restrained in the poultry cradle.

In a third aspect, one or more embodiments of a method of detecting a claw of a rear-facing toe on a shank of a bird as described herein include: positioning a bird in a poultry cradle in a selected position relative to a system frame, wherein a left shank of the bird is located in a left shank clamp and a left shank guide of the poultry cradle; moving a seat of the bird away from the left shank clamp after positioning the bird in the poultry cradle in the selected position relative to the system frame; moving a distal end of the left shank of the bird towards the left shank clamp while moving the seat of the bird away from the left shank clamp; moving a claw sensor to a forward position proximate the left shank of the bird after moving the distal end of the left shank of the bird towards the left shank clamp; and detecting an anatomical feature on the left shank of the bird using the claw sensor.

In one or more embodiments of a method of detecting a claw of a rear-facing toe on a shank of a bird as described herein, the anatomical feature comprises a rear-facing claw on the left shank of the bird.

In one or more embodiments of a method of detecting a claw of a rear-facing toe on a shank of a bird as described herein, detecting the anatomical feature comprises detecting the anatomical feature while moving the claw sensor to the forward position.

In one or more embodiments of a method of detecting a claw of a rear-facing toe on a shank of a bird as described herein, detecting the anatomical feature comprises detecting the anatomical feature after moving the claw sensor to the forward position.

In one or more embodiments of a method of detecting a claw of a rear-facing toe on a shank of a bird as described herein, moving the seat of the bird away from the left shank clamp comprises moving the seat of the bird away from the left shank clamp by moving a seat lift from a ready position to a lift position, and wherein, optionally, moving the seat lift from the ready position to the lift position comprises rotating the seat lift about a lift axis.

In one or more embodiments of a method of detecting a claw of a rear-facing toe on a shank of a bird as described herein, the method comprises moving the forward-facing toes on the left shank of the bird towards the head of the bird before moving the claw sensor to the forward position.

In one or more embodiments of a method of detecting a claw of a rear-facing toe on a shank of a bird as described herein, the method comprises moving the forward-facing toes on the left shank of the bird towards the head of the bird while moving the claw sensor to the forward position.

In one or more embodiments of a method of detecting a claw of a rear-facing toe on a shank of a bird as described herein, the method comprises moving the forward-facing toes on the left shank of the bird towards the head of the bird after moving the claw sensor to the forward position. In one or more embodiments, moving the forward-facing toes on the left shank of the bird towards the head of the bird comprises moving a toe control bar from a retracted position to a control position, and wherein, optionally, moving the toe control bar from the retracted position to the control position comprises rotating the control bar about a control bar axis.

In one or more embodiments of a method of detecting a claw of a rear-facing toe on a shank of a bird as described herein, the method comprises moving the claw sensor along the left shank of the bird towards the distal end of the left shank after moving the claw sensor to the forward position, and wherein, optionally, moving the claw sensor towards the distal end of the left shank comprises rotating the claw sensor about a track axis.

In one or more embodiments of a method of detecting a claw of a rear-facing toe on a shank of a bird as described herein, detecting the anatomical feature on the left shank of the bird comprises one or both of optically detecting the anatomical feature, capacitively detecting the anatomical feature, and detecting a change in an RF electric field caused by the anatomical feature.

In one or more embodiments of a method of detecting a claw of a rear-facing toe on a shank of a bird as described herein, the method comprises delivering energy to the rear-facing claw using the claw sensor, wherein the energy is sufficient to retard growth of the rear-facing toe.

In a fourth aspect, one or more embodiments of a rear-facing poultry claw system as described herein includes: a toe control bar operably attached to the system frame, the toe control bar configured to move between a retracted position and a control position; a control bar actuator operably connected to the toe control bar, the control bar actuator configured to move the toe control bar between the retracted position and the control position; a seat lift operably attached to a system frame, the seat lift configured to move between a ready position and a lift position; a seat lift actuator operably connected to the seat lift, the seat lift actuator configured to rotate the seat lift about the lift axis to move the seat lift between the ready position and the lift position; and a controller operably connected to the seat lift actuator and the control bar actuator, wherein the controller is configured to: operate the seat lift actuator such that the seat lift actuator moves the seat lift from the ready position to the lift position, and operate the control bar actuator such that the control bar actuator moves the toe control bar from the retracted position to the control position after operating the seat lift actuator to rotate the seat lift from the ready position to the lift position.

In one or more embodiments of a rear-facing poultry claw system according to the fourth aspect as described herein, the seat lift is configured to rotate about a lift axis when moving between the ready position and the lift position.

In one or more embodiments of a rear-facing poultry claw system according to the fourth aspect as described herein, the toe control bar is configured to rotate about a control bar axis when moving between the retracted position and the control position.

In one or more embodiments of a rear-facing poultry claw system according to the fourth aspect as described herein, the system comprises: a claw sensor configured to detect a claw of a rear-facing toe on a shank of a bird; a sensor track operably attached to the system frame, the sensor track defining a sensing axis, wherein the claw sensor is mounted on the sensor track and configured to move along the sensing axis between a home position and a forward position, wherein the claw sensor is closer to the toe control bar in the forward position than the home position; and a claw sensor actuator operably connected to the claw sensor, the claw sensor actuator configured to move the claw sensor along the sensing axis between the home position and the forward position; and wherein the controller is operably attached to the claw sensor actuator, the controller configured to operate the claw sensor actuator such that the claw sensor actuator moves the claw sensor along the sensing axis from the home position to the forward position after operating the control bar actuator to move the toe control bar from the retracted position to the control position.

In one or more embodiments of a rear-facing poultry claw system including a claw sensor according to the fourth aspect as described herein, the system further comprises a track actuator operably attached to the sensor track, wherein the track actuator is configured to move the sensor track between a base position and a sensing position, and wherein the controller is operably connected to the track actuator, the controller being configured to operate the track actuator such that the track actuator moves the sensor track from the base position to the sensing position after operating the control bar actuator to move the toe control bar from the retracted position to the control position.

In one or more embodiments of a rear-facing poultry claw system including a claw sensor according to the fourth aspect as described herein, the track actuator is configured to move the sensor track between the sensing position and a finish position, wherein the controller is configured to operate the track actuator such that the sensor track actuator moves the sensor track from the sensing position to the finish position after moving the sensor track to the sensing position.

In one or more embodiments of a rear-facing poultry claw system including a claw sensor according to the fourth aspect as described herein, the track actuator is configured to rotate the sensor track about a track axis when moving the sensor track between the base position and the sensing position.

In one or more embodiments of a rear-facing poultry claw system according to the fourth aspect as described herein, the lift axis is offset from one or both of the control bar axis and the track axis, and wherein, optionally, the lift axis is generally parallel to one or both of the control bar axis and track axis.

In one or more embodiments of a rear-facing poultry claw system according to the fourth aspect as described herein, the claw sensor is selected from an RF electric field generator/sensor, a capacitive sensor, and an optical detector.

In one or more embodiments of a rear-facing poultry claw system according to the fourth aspect as described herein, the system comprises a poultry cradle located in a selected position relative to the system frame, wherein the poultry cradle is configured to restrain a bird such that the seat lift acts on a seat of the bird when the poultry cradle is in the selected position and the seat lift is in the lift position.

In one or more embodiments of a rear-facing poultry claw system including a poultry cradle according to the fourth aspect as described herein, the poultry cradle comprises: a torso support shaped to support and atraumatically retain a torso of the bird restrained in the poultry cradle; a head support operably attached to the torso support and positioned to receive a head of the bird restrained in the poultry cradle with its chest supported against the torso support; a head clamp operably attached to the head support, wherein the head clamp and the head support cooperate to receive and atraumatically retain the head of the bird between the head clamp and the head support; a shank clamp operably attached to the torso support, the shank clamp positioned to receive and atraumatically retain a shank of the bird restrained in the poultry cradle, wherein the shank clamp comprises an open configuration in which the shank can be positioned in the shank clamp and a closed configuration in which the shank is retained in the shank clamp; and an optional shank guide positioned between the shank clamp and the torso support, the shank guide restraining the shank of the bird restrained in the poultry cradle from movement in the lateral and medial directions when the shank clamp is in the open configuration and the closed configuration; wherein, optionally, a position of the shank guide relative to the torso support and the shank clamp is fixed; wherein, optionally, a distance between an inferior/distal/bottom side the shank clamp and an inferior/distal/bottom side of the shank guide along a longitudinal (superior/inferior) axis extending through the head support and the torso support is 5 millimeters or more, 1 centimeter or more, or 2 centimeters or more; and wherein, optionally, the distance between an inferior/distal/bottom side the shank clamp and an inferior/distal/bottom side of the shank guide along a longitudinal (superior/inferior) axis extending through the head support and the torso support is 3 centimeters or less, 2 centimeters or less, or 1 centimeter or less.

In one or more embodiments of a rear-facing poultry claw system including a poultry cradle according to the fourth aspect as described herein, the toe control bar is configured to act on forward-facing toes on the shank of the bird retained in the shank clamp. In one or more embodiments, the toe control bar is configured to move the forward-facing toes towards the head of the bird restrained in the poultry cradle.

In a fifth aspect, one or more embodiments of methods of positioning a claw of a rear-facing toe on a shank of a bird as described herein include: positioning a bird in a poultry cradle in a selected position relative to a system frame, wherein a left shank of the bird is located in a left shank clamp and an optional left shank guide of the poultry cradle; moving a seat of the bird away from the left shank clamp after positioning the bird in the poultry cradle in the selected position relative to the system frame; and moving a distal end of the left shank of the bird towards the left shank clamp while moving the seat of the bird away from the left shank clamp.

In one or more embodiments of methods of positioning a claw of a rear-facing toe on a shank of a bird according to the fifth aspect as described herein, moving the seat of the bird away from the left shank clamp comprises moving the seat of the bird away from the left shank clamp by moving a seat lift from a ready position to a lift position, and wherein, optionally, moving the seat lift from the ready position to the lift position comprises rotating the seat lift about a lift axis.

In one or more embodiments of methods of positioning a claw of a rear-facing toe on a shank of a bird according to the fifth aspect as described herein, the method comprises moving the forward-facing toes on the left shank of the bird towards the head of the bird after moving the seat of the bird away from the left shank clamp. In one or more embodiments, moving the forward-facing toes on the left shank of the bird towards the head of the bird comprises moving a toe control bar from a retracted position to a control position, and wherein, optionally, moving the toe control bar from the retracted position to the control position comprises rotating the control bar about a control bar axis.

In one or more embodiments of methods of positioning a claw of a rear-facing toe on a shank of a bird according to the fifth aspect as described herein, the method further comprises: moving a claw sensor to a forward position proximate the left shank of the bird after moving the distal end of the left shank of the bird towards the left shank clamp; and detecting an anatomical feature on the left shank of the bird using the claw sensor.

In one or more embodiments of methods of positioning a claw of a rear-facing toe on a shank of a bird according to the fifth aspect that include moving a claw sensor as described herein, the method comprises moving the claw sensor along the left shank of the bird towards the distal end of the left shank after moving the claw sensor to the forward position, and wherein, optionally, moving the claw sensor towards the distal end of the left shank comprises rotating the claw sensor about a track axis.

In one or more embodiments of methods of positioning a claw of a rear-facing toe on a shank of a bird according to the fifth aspect that include moving a claw sensor as described herein, the anatomical feature comprises a rear-facing claw on the left shank of the bird.

In one or more embodiments of methods of positioning a claw of a rear-facing toe on a shank of a bird according to the fifth aspect that include moving a claw sensor as described herein, detecting the anatomical feature comprises detecting the anatomical feature while moving the claw sensor to the forward position.

In one or more embodiments of methods of positioning a claw of a rear-facing toe on a shank of a bird according to the fifth aspect that include moving a claw sensor as described herein, detecting the anatomical feature comprises detecting the anatomical feature after moving the claw sensor to the forward position.

In one or more embodiments of methods of positioning a claw of a rear-facing toe on a shank of a bird according to the fifth aspect that include moving a claw sensor as described herein, moving the seat of the bird away from the left shank clamp comprises moving the seat of the bird away from the left shank clamp by moving a seat lift from a ready position to a lift position, and wherein, optionally, moving the seat lift from the ready position to the lift position comprises rotating the seat lift about a lift axis.

In one or more embodiments of methods of positioning a claw of a rear-facing toe on a shank of a bird according to the fifth aspect that include moving a claw sensor as described herein, the method comprises moving the forward-facing toes on the left shank of the bird towards the head of the bird before moving the claw sensor to the forward position.

In one or more embodiments of methods of positioning a claw of a rear-facing toe on a shank of a bird according to the fifth aspect that include moving a claw sensor as described herein, the method comprises moving the forward-facing toes on the left shank of the bird towards the head of the bird while moving the claw sensor to the forward position.

In one or more embodiments of methods of positioning a claw of a rear-facing toe on a shank of a bird according to the fifth aspect that include moving a claw sensor as described herein, the method comprises moving the forward-facing toes on the left shank of the bird towards the head of the bird after moving the claw sensor to the forward position.

In one or more embodiments of methods of positioning a claw of a rear-facing toe on a shank of a bird according to the fifth aspect that include moving a claw sensor as described herein, detecting the anatomical feature on the left shank of the bird comprises one or both of optically detecting the anatomical feature, capacitively detecting the anatomical feature, and detecting a change in an RF electric field caused by the anatomical feature.

In one or more embodiments of methods of positioning a claw of a rear-facing toe on a shank of a bird according to the fifth aspect that include moving a claw sensor as described herein, the method comprises delivering energy to the rear-facing claw using the claw sensor, wherein the energy is sufficient to retard growth of the rear-facing toe.

As used herein with respect to the restraint of live birds, the term "atraumatic restraint" (and variations thereof) means restraint that does not require puncturing the skin of the bird to restrain the bird.

As used herein, the term "aligned with" as used in connection with various components, axes, directions of travel, etc. includes both parallel and generally parallel arrangements. For example, two axes may be described as "aligned with" when the axes are both perfectly parallel with each other or nearly parallel, e.g., the axes may form an angle with each other that is greater than 0° but 10° or less.

Numeric values used herein include normal variations in measurements as expected by persons skilled in the art and should be understood to have the same meaning as "approximately" and to cover a typical margin of error, such as +5% of the stated value.

Terms such as "a," "an," and "the" are not intended to refer to only a singular entity but include the general class of which a specific example may be used for illustration.

The terms "a," "an," and "the" are used interchangeably with the term "at least one." The phrases "at least one of" and "comprises at least one of" followed by a list refers to any one of the items in the list and any combination of two or more items in the list.

As used here, the term "or" is generally employed in its usual sense including "and/or" unless the content clearly dictates otherwise. The term "and/or" means one or all of the listed elements or a combination of any two or more of the listed elements.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure, including the claims.

BRIEF DESCRIPTION OF THE DRAWING

The views of the drawing depict various features of only some illustrative embodiments of the present invention, with like reference numerals indicating like features in the figures.

Figure 1:
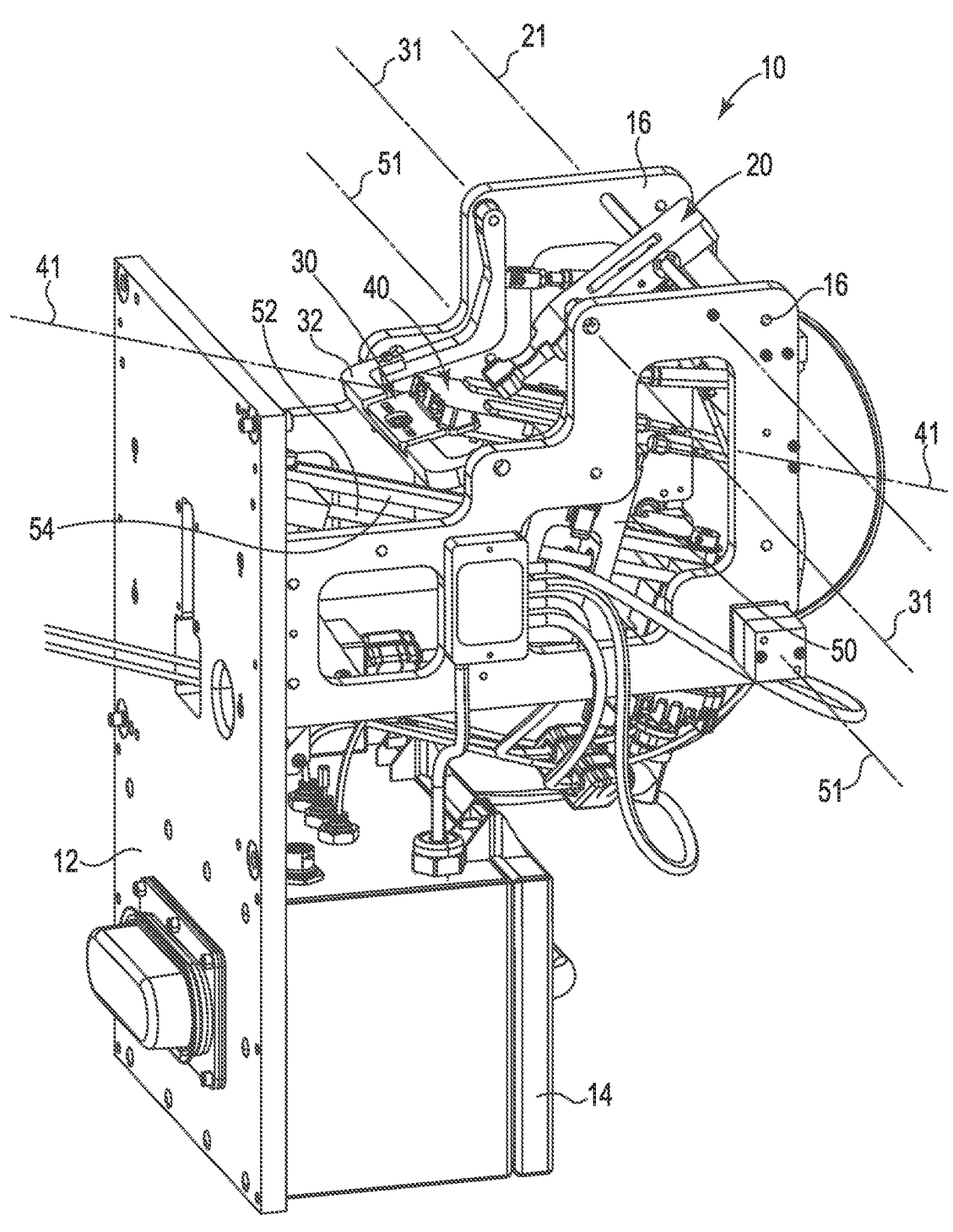
FIG. 1 is a top perspective view of one illustrative embodiment of a rear-facing poultry claw system as described herein.

While the above-identified figures (which may or may not be drawn to scale) set forth embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope of this invention.

DESCRIPTION OF ILLUSTRATIVE EMBODIMENTS

Before any illustrative embodiments are described in detail, it is to be understood that the invention is not limited in its application to the details of construction and the arrangement of components set forth in the following description or illustrated in the figures of the drawing. The invention is capable of other embodiments and of being practiced or of being carried out in various ways.

Figure 2:
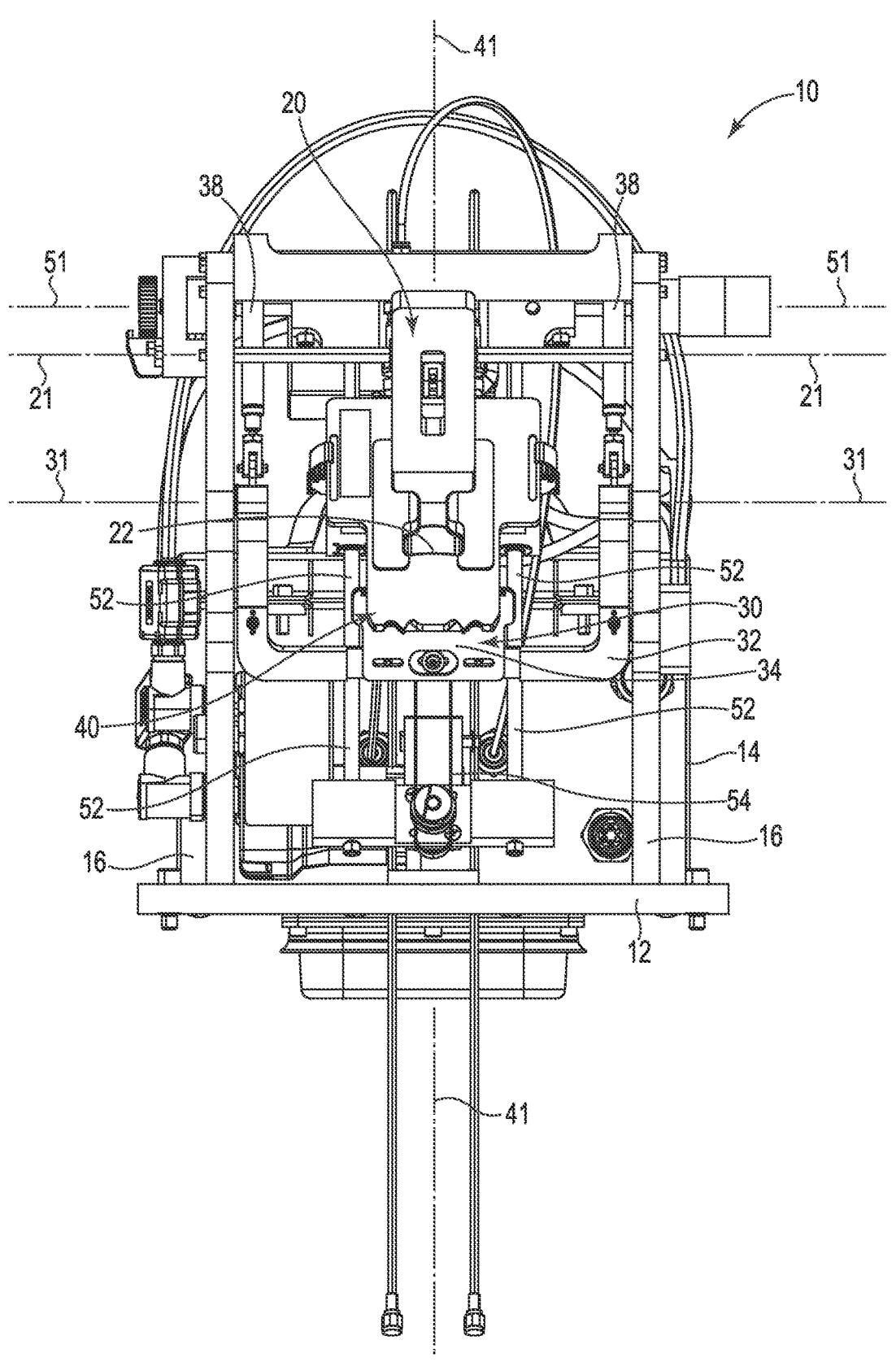
FIG. 2 is a top view of the rear-facing poultry claw system of FIG. 1.
Figure 3:
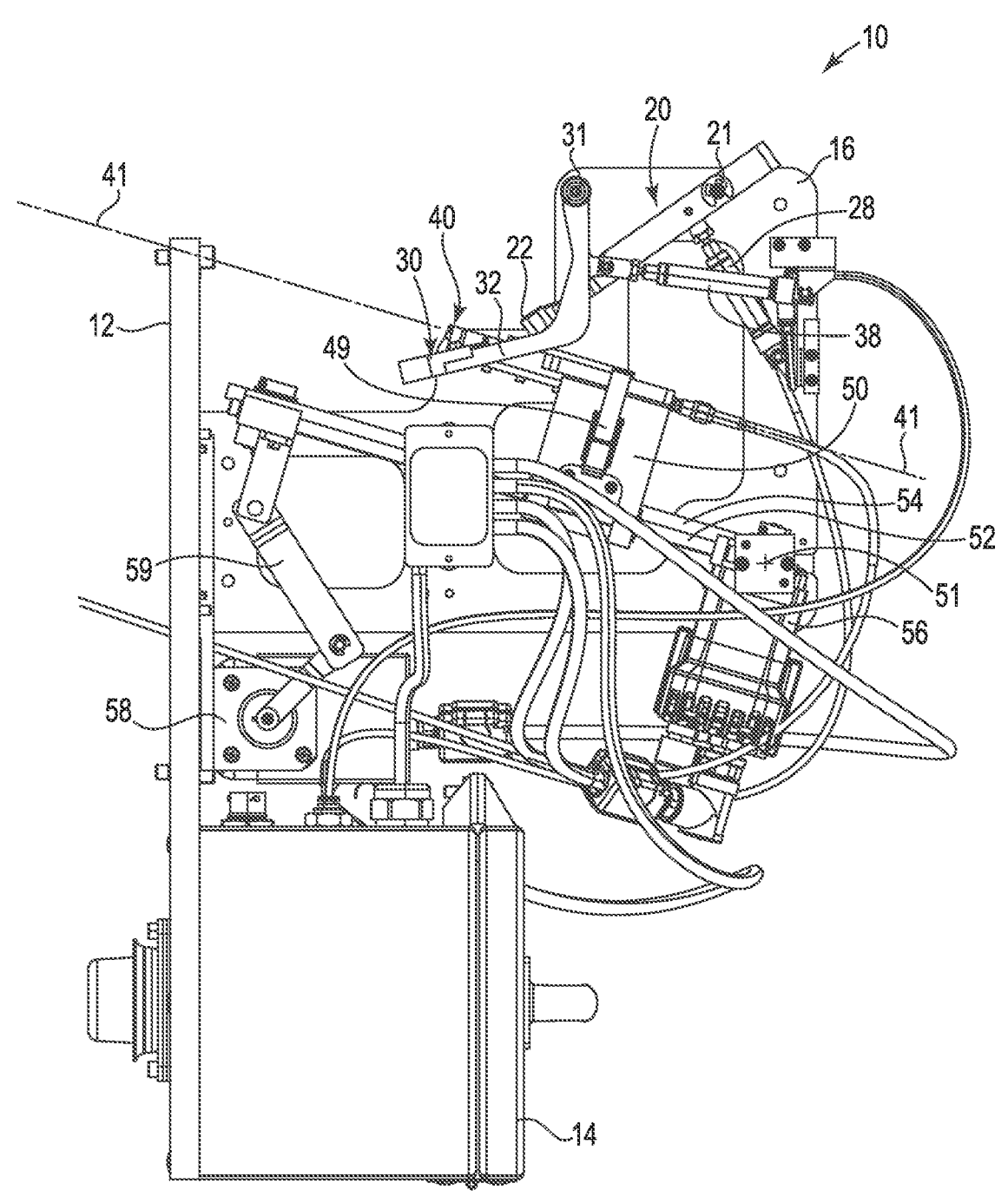
FIG. 3 is a left side view of the rear-facing poultry claw system of FIGS. 1 and 2 with the left side plate removed to expose components of the poultry detection system.

FIGS. 1-3 are views of one illustrative embodiment of a rear-facing poultry claw system 10 that may be used to detect the claws of the rear-facing toes on shanks of a bird as described herein. FIG. 1 is a top perspective view of the illustrative system 10, FIG. 2 is a top view of the system 10 and FIG. 3 is a left side view of the system 10 with the left side plate removed to expose components of the rear-facing poultry claw system 10.

The rear-facing poultry claw system 10 includes a seat lift 20, toe control bar 30, claw sensor 40, and claw sensor carriage 50 mounted on a sensor track which, in the depicted embodiment, is constituted by rail assembly 52. These components are all mounted on a system frame that includes a base plate 12 and pair of side plates 16 attached to and extending away from the base plate 12. In one or more embodiments, the base plate 12 of the system frame may be configured for attachment to a larger system capable of processing many birds. Some illustrative examples of such systems may be described in, e.g., U.S. Pat. No. 7,066,112, titled AUTOMATED POULTRY PROCESSING METHOD AND SYSTEM.

In the depicted illustrative embodiment, the seat lift 20 includes a lift end 22 configured to contact the seat of a bird B restrained in a poultry cradle C10 located in a selected position relative to the system frame and, therefore, the components of the rear-facing poultry claw system 10. The seat lift 20 is operably attached to the system frame and is configured to move between a ready position (seen in, e.g., FIGS. 1-5 and 14) and a lift position (seen in, e.g., FIGS. 10-13). The depicted seat lift 20 is configured to rotate about a lift axis 21 when moving between the ready position and the lift position, but motion other than rotation can be used to move the seat lift 20 between its ready and lift positions.

The depicted illustrative embodiment of rear-facing poultry claw system 10 includes a seat lift actuator 28 operably connected to the seat lift 20. Operation of the seat lift actuator 28 moves the seat lift 20 from its ready position as seen in, e.g., FIG. 5 to its lift position as seen in, e.g., FIG. 10. In the depicted illustrative embodiment, seat lift actuator 28 is in the form of a pneumatic piston/cylinder that extends and retracts to move the seat lift 20 between its ready and lift positions. The depicted illustrative embodiment of seat lift actuator 28 is only one example of an actuator that may be used to move the seat lift 20 between its ready and lift positions. Examples of potentially useful alternative actuators include, but are not limited to, a piston/cylinder operated hydraulically, pneumatically, using a solenoid, etc., a motor with or without a gear assembly (e.g., a rack and pinion, etc.), magnetic/electromagnetic linear actuators, rotary actuators (e.g., pneumatic actuators, magnetic/electromagnetic actuators, etc.), etc.

The depicted illustrative embodiment of rear-facing poultry claw system 10 also includes a toe control bar 30 operably attached to the system frame (which, in the depicted illustrative embodiment, includes base plate 12 and side plates 16). The toe control bar 30 is configured to move between a retracted position (as seen in, e.g., FIGS. 1-5, 10, and 14) and a control position (as seen in, e.g., FIGS. 11-13). In the depicted illustrative embodiment, toe control bar 30 is configured to rotate about a control bar axis 31 when moving between the retracted position and the control position, but motion other than rotation can be used to move the toe control bar 30 between its retracted and control positions.

The depicted illustrative embodiment of toe control bar 30 includes a frame 32 attached to side plates 16 of the system frame and toe platform 34 mounted centrally on the frame 32 such that the toe platform 34 is located proximate the claw sensor 40 when the claw sensor 40 is in its forward position as described herein. As a result, the toe platform 34 is configured to control and support the forward-facing toes of a bird during detection of the rear-facing toes on the shanks of a bird as described herein.

The depicted illustrative embodiment of rear-facing poultry claw system 10 includes a control bar actuator 38 operably connected to the toe control bar 30. Operation of the control bar actuator 38 moves the toe control bar 30 from its retracted position as seen in, e.g., FIG. 10, to its control position as seen in, e.g., FIG. 11. In the depicted illustrative embodiment, the control bar actuator 38 is in the form of a pneumatic cylinder that extends and retracts to move the toe control bar 30 between its retracted and control positions. The depicted illustrative embodiment of control bar actuator 38 is only one example of an actuator that may be used to move the toe control bar 30 between its retracted and control positions. Examples of potentially useful alternative actuators include, but are not limited to, a piston/cylinder operated hydraulically, using a solenoid, etc., a motor with or without a gear assembly (e.g., a rack and pinion, etc.), magnetic/electromagnetic linear actuators, rotary actuators (e.g., pneumatic actuators, magnetic/electromagnetic actuators, etc.), etc.

The depicted illustrative embodiment of rear-facing poultry claw system 10 also includes a claw sensor 40 operably attached to the system frame which, in the depicted illustrative embodiment, includes a base plate 12 and side plates 16. The claw sensor 40 is attached to and supported above a carriage 50. In the depicted embodiment, the claw sensor 40 is attached to carriage 50 using clamps 49 (see, e.g., FIGS. 3 and 5).

Figures 15, 16:
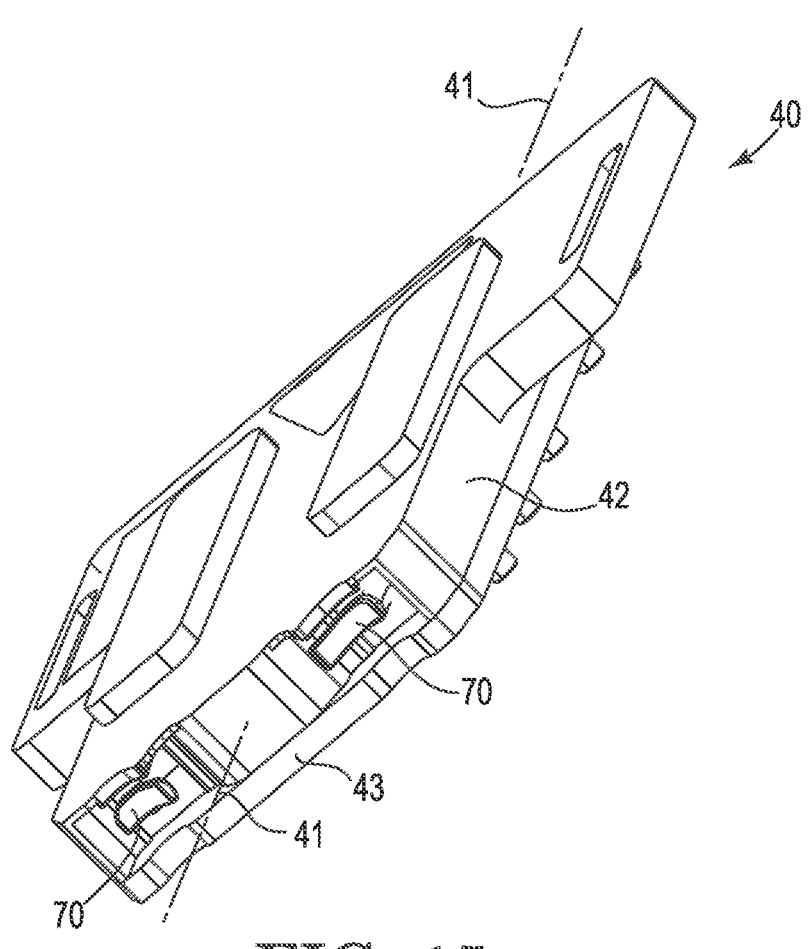
FIG. 15 is a top perspective view of one illustrative embodiment of a claw sensor that can be used in one or more embodiments of a rear-facing poultry claw systems as described herein.
FIG. 16 is a front end view of the claw sensor of FIG. 15.

With reference to FIG. 15 as well as FIGS. 1-3, the depicted illustrative embodiment of claw sensor 40 includes a pair of radiofrequency (RF) energy applicators 70 which can be used to detect the rear-facing toes on one or both shanks of birds as described herein. Although the depicted embodiment of claw sensor 40 includes a pair of RF energy applicators 70, one or more alternative embodiments may include only a single RF energy applicators 70 positioned to detect the rear-facing toe on either the left or right side of a bird. One advantage of providing a pair of RF energy applicators 70 arranged to detect rear-facing toes on both the left and right shanks of a bird is that both rear-facing toes can be detected at the same time using a rear-facing poultry claw system as described herein.

The illustrative embodiment of the rear-facing poultry claw system 10 also includes a sensor track operably attached to the system frame which, in the depicted illustrative embodiment, includes the base plate 12 and side plates 16. In the depicted illustrative embodiment, the sensor track is defined by rail assembly 52 including two rails that extends away from the base plate 12 between the side plates 16. Carriage 50 is configured to move along the sensor track/rail assembly 52. Because claw sensor 40 is attached to carriage 50, movement of carriage 50 along the sensor track/rail assembly 52 causes corresponding movement of the claw sensor 40 along the sensing axis 41 that is aligned with the sensor track/rail assembly 52.

In the depicted embodiment, carriage 50 is operably attached to a claw sensor actuator in the form of a motor assembly 56 configured to operate on a belt 54 aligned with the toe sensing axis 41 and rails 52. The carriage 50 is operably attached to the belt 54 such that movement of the belt 54 in a direction aligned with the sensing axis 41 moves the carriage 50 and attached claw sensor 40 along the sensing axis 41.

The claw sensor actuator is, in the depicted illustrative embodiment, in the form of a motor assembly 56 operating on belt 54. The depicted embodiment of motor assembly 56 is in the form of a stepper motor operably connected to a controller 14 as described herein. In one or more alternative embodiments, however, motor assembly 56 may be provided in the form of any other electric/electromagnetic motor, pneumatic motor, hydraulic motor, etc.

Although the claw sensor actuator is, in the depicted illustrative embodiment, in the form of a motor assembly operating on belt 54, any suitable combination of components configured to move the carriage 50 and attached claw sensor 40 along the sensing axis 41 could be used in place of the depicted motor assembly 56 and belt 54. Suitable alternatives providing linear motion to move the carriage 50 and claw sensor 40 may include, but are not limited to, pistons or cylinders (e.g., hydraulic, pneumatic, solenoid-driven, etc.), motor assemblies combined with lead screws and followers, a rack and pinion, etc.

As will be described herein, the claw sensor 40 is mounted on the sensor track and configured to move along the sensing axis 41 between a home position (as seen in, e.g., FIGS. 4, 5, 10-11, and 14) and a forward position (as seen in, e.g., FIGS. 12-13). In the home position, the claw sensor 40 is located further from the toe platform 34 on toe control bar 30 (when toe control bar 30 is in its control position) than when the claw sensor 40 is in the forward position.

The depicted illustrative embodiment of the rear-facing poultry claw system 10 also includes a track actuator operably connected to the sensor track (which, in the depicted embodiment, is in the form of rail assembly 52) and configured to move the sensor track/rail assembly 52 between a base position, and a finish position. Because the claw sensor 40 is mounted on carriage 50 which moves along sensor track/rail assembly 52, movement of the sensor track/rail assembly 52 between the base, sensing, and finish positions moves the sensing axis 41 along with the claw sensor 40 and carriage 50 between those positions as well.

Figure 4:
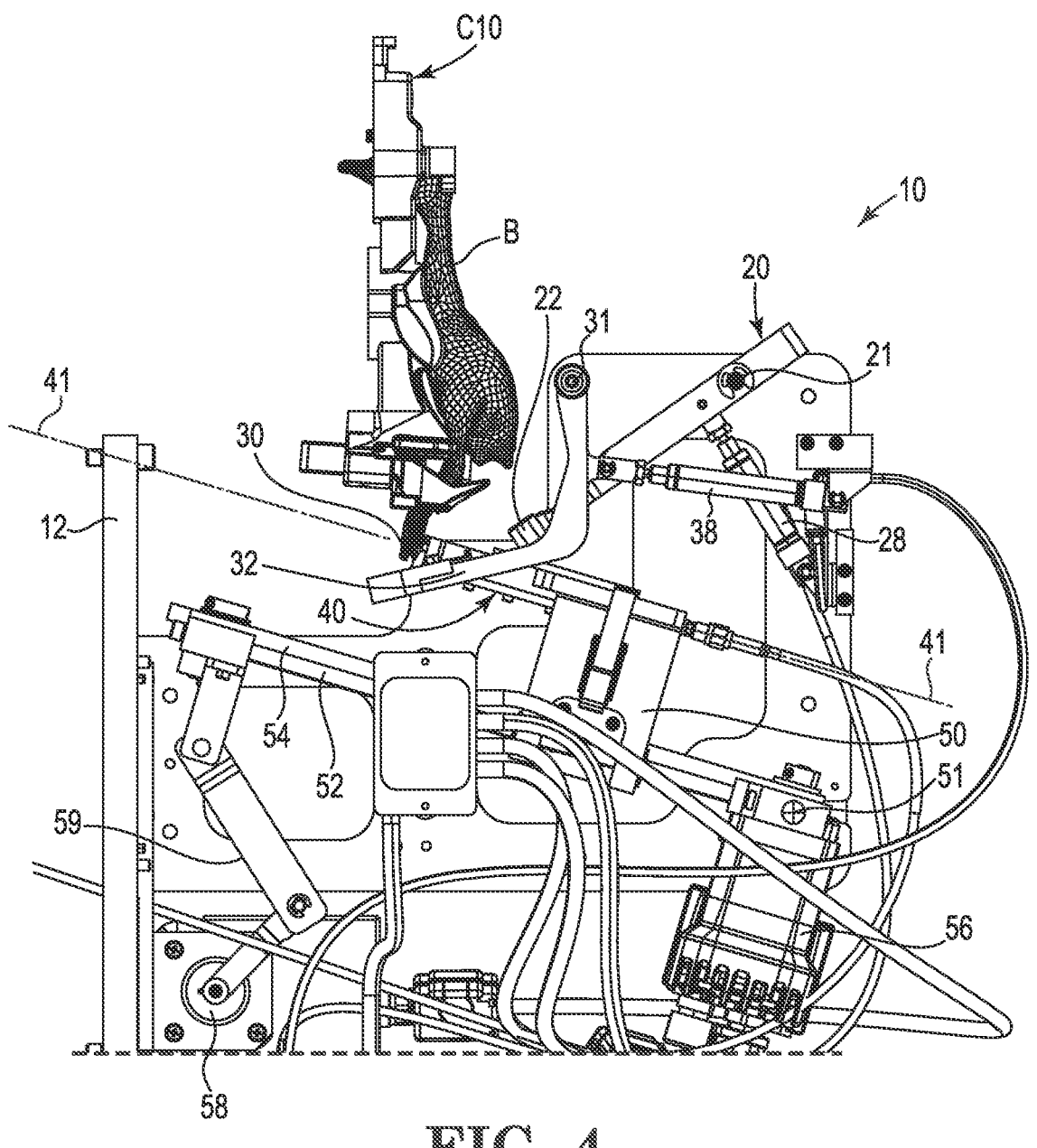
FIG. 4 is a left side view of the rear-facing poultry claw system of FIGS. 1-3, with a bird restrained in a poultry cradle in a selected position relative to the system.

The track actuator in the depicted illustrative embodiment of system 10 is seen in, e.g., FIGS. 3 and 4 and includes a motor assembly 58 operable on a drive link 59 to move the end of the rail assembly 52 of the sensor track relative to the base plate 12 between the base, sensing, and finish positions. In the sensing position, the sensor track/rail assembly 52 is located closer to the seat lift 20 and lift axis 21 than when the sensor track/rail assembly 52 is in either of its base or finish positions. Although the depicted embodiment of the sensor track/rail assembly 52 rotates about track axis 51 when moving between the base, sensing, and finish positions, in one or more alternative embodiments, the sensor track/rail assembly 52 and components carried thereon may be moved towards and away from the seat lift 20 and seat lift axis 21 through translational motion or a combination of rotation and translation.

Motor assembly 58 of the depicted illustrative embodiment of a track actuator may be in the form of a stepper motor or other rotary device capable of providing precisely controlled movement of the sensor track/rail assembly 52 between its base, sensing, and finish positions using drive link 59.

Although motor assembly 58 and drive link 59 form one illustrative embodiment of a track actuator that may be used in one or more embodiments of the rear-facing poultry claw systems described herein, the track actuators used in the rear-facing poultry claw systems described herein may take many other forms including, but not limited to, pistons or cylinders (e.g., hydraulic, pneumatic, solenoid-driven, etc.), motor assemblies combined with lead screws and followers, a rack and pinion, etc.

Figure 5:
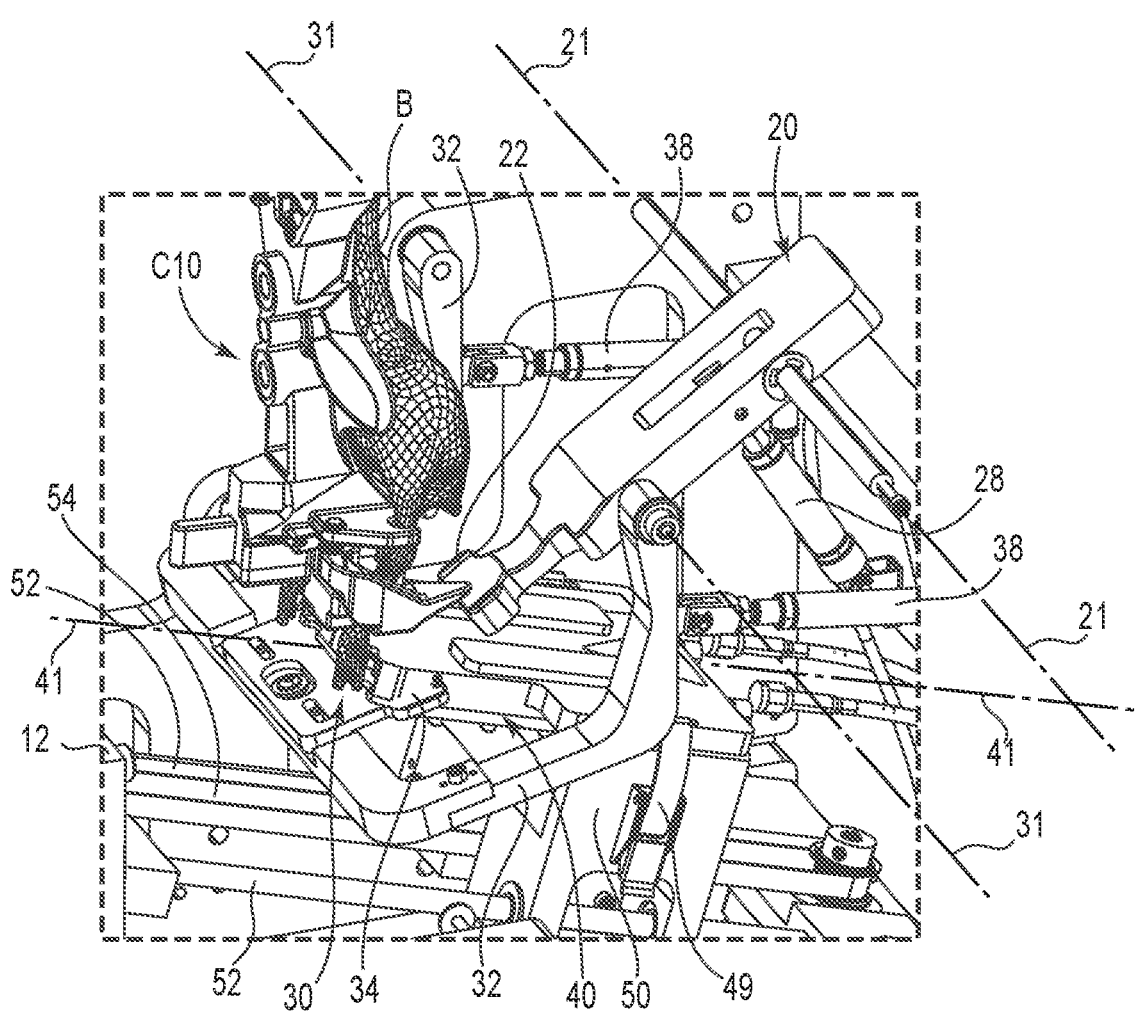
FIG. 5 is an enlarged top perspective view of the poultry detection system of FIG. 4.
Figure 6:
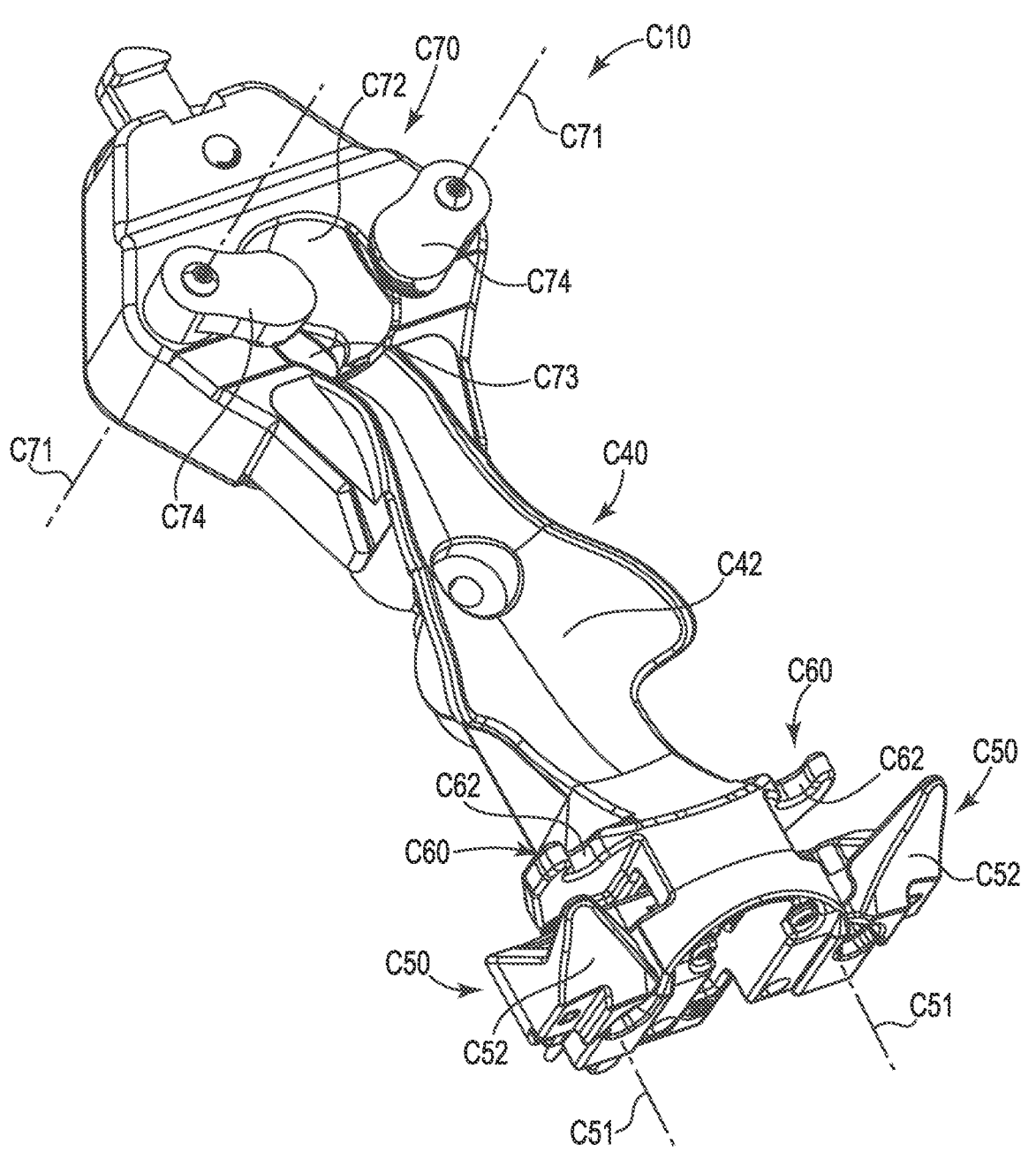
FIG. 6 is a perspective view of one illustrative embodiment of a poultry cradle that can be used in connection with the rear-facing poultry claw systems as described herein.
Figure 7:
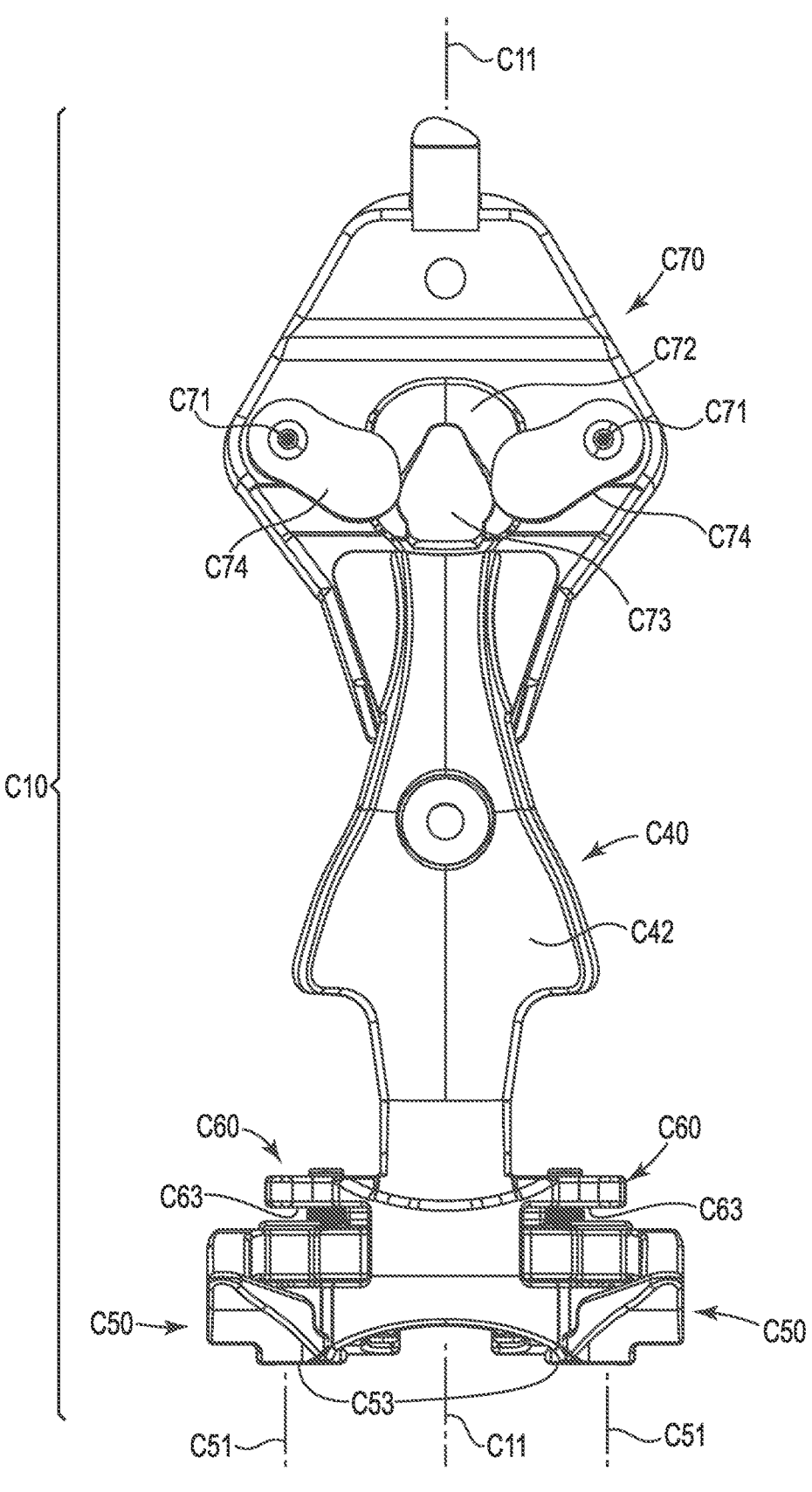
FIG. 7 is front plan view of the poultry cradle of FIG. 6.
Figure 8:
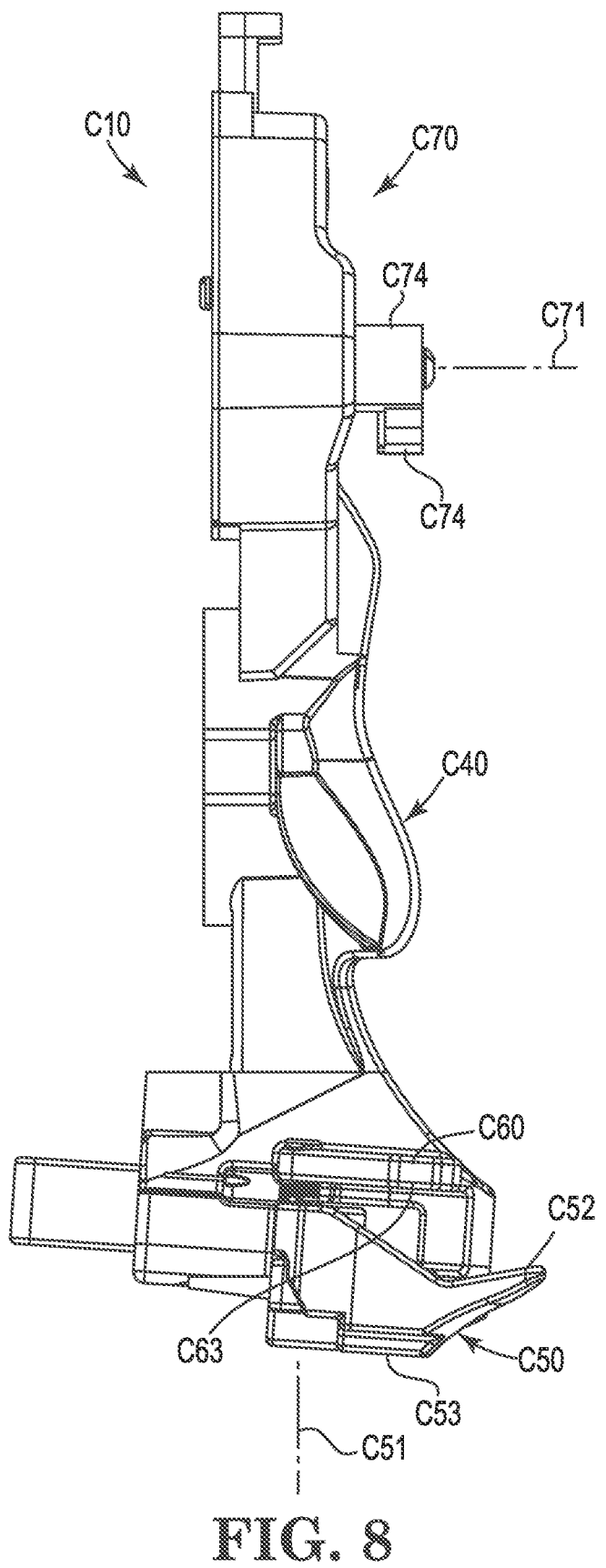
FIG. 8 is a side plan view of the poultry cradle of FIG. 6.

The illustrative embodiment of rear-facing poultry claw system 10 is depicted in FIGS. 4 and 5 along with a poultry cradle C10 in which a bird B is restrained (preferably atraumatically). The poultry cradle C10 is located in a selected position relative to the system frame (i.e., represented by base plate 12 and side plate 16 in FIG. 4) such that the seat lift 20, toe control bar 30, and claw sensor 40 can be used to detect the rear-facing toes on the shanks of the bird B restrained in the poultry cradle C10. Although depicted in space, i.e., not attached to any other components, it should be understood that the poultry cradle C10 will preferably be carried on a carrier system such as, e.g., a belt, chain, etc. In some embodiments, however, the poultry cradle C10 may be manually placed on a stationary holder such that the poultry cradle C10 is in the selected position relative to the system frame.

The illustrative embodiment of poultry cradle C10 is depicted separately in FIGS. 6-9 in the absence of the bird B as seen in FIGS. 4 and 5. The poultry cradle C10 is depicted in a perspective view in FIG. 6, a front plan view in FIG. 7, and a side plan view in FIG. 8 (similar to the view of cradle C10 in FIG. 4). The end of the poultry cradle is depicted in an enlarged view in FIG. 9. The depicted poultry cradle C10 includes a torso support C40, a pair of shank control apparatus each including a shank clamp C50 and and optional shank guide C60, and an optional head support C70. The various components may be operably attached in a manner that provides for atraumatic restraint of a bird positioned in the poultry cradle C10.

In one or more embodiments, the torso support C40 includes a support surface C42 shaped to generally follow the anatomical shape of the torso of a bird located in the poultry cradle C10 such that the torso of the bird is generally evenly supported. As a result, the shape of the support surface C42 may be different depending on the breed, age, gender, etc. of the birds that are to be restrained in the poultry cradle C10.

The shank control apparatus are provided and positioned to restrain the left and right shanks of a bird having its torso supported by the torso support C40. Each shank control apparatus includes a shank clamp C50 positioned to retain a shank of a bird at a location below the joint commonly referred to as the "hock" joint and above the joints of the forward-facing toes at the distal/inferior end of the shank, while the optional shank guide C60 is positioned to act on the shank above or proximal/superior to the shank clamp C50.

While the shank clamps C50 prevent the bird from moving its shank in any direction other than along the length of its shank (aligned with axes C51), the depicted illustrative embodiments of shank guides C60 can help to limit or prevent movement of the shanks contained therein along the lateral and medial directions of the restrained bird. The shank guides C60 include a slot C62 configured to receive a shank of bird positioned in the shank clamp C50 located below/inferior to the shank guide C60. Because the shank guide is in the form of a slot C62, the shank guide C60 alone cannot restrain movement of a shank of a restrained bird in the dorsal (rearward) direction.

The combined two-point restraint of the shanks by the shank clamps C50 and shank guides C60 (in addition to supporting their torsos and restraining their heads) can provide additional control over the hock joints of a restrained bird at the proximal/superior ends of the shanks and the distal/inferior ends of the shanks. That additional control over the shanks and forward-facing toes/phalanges may be needed when, for example, the rear-facing toes of birds are to be accurately positioned for detection using a rear-facing poultry claw system as described herein.

Figure 9:
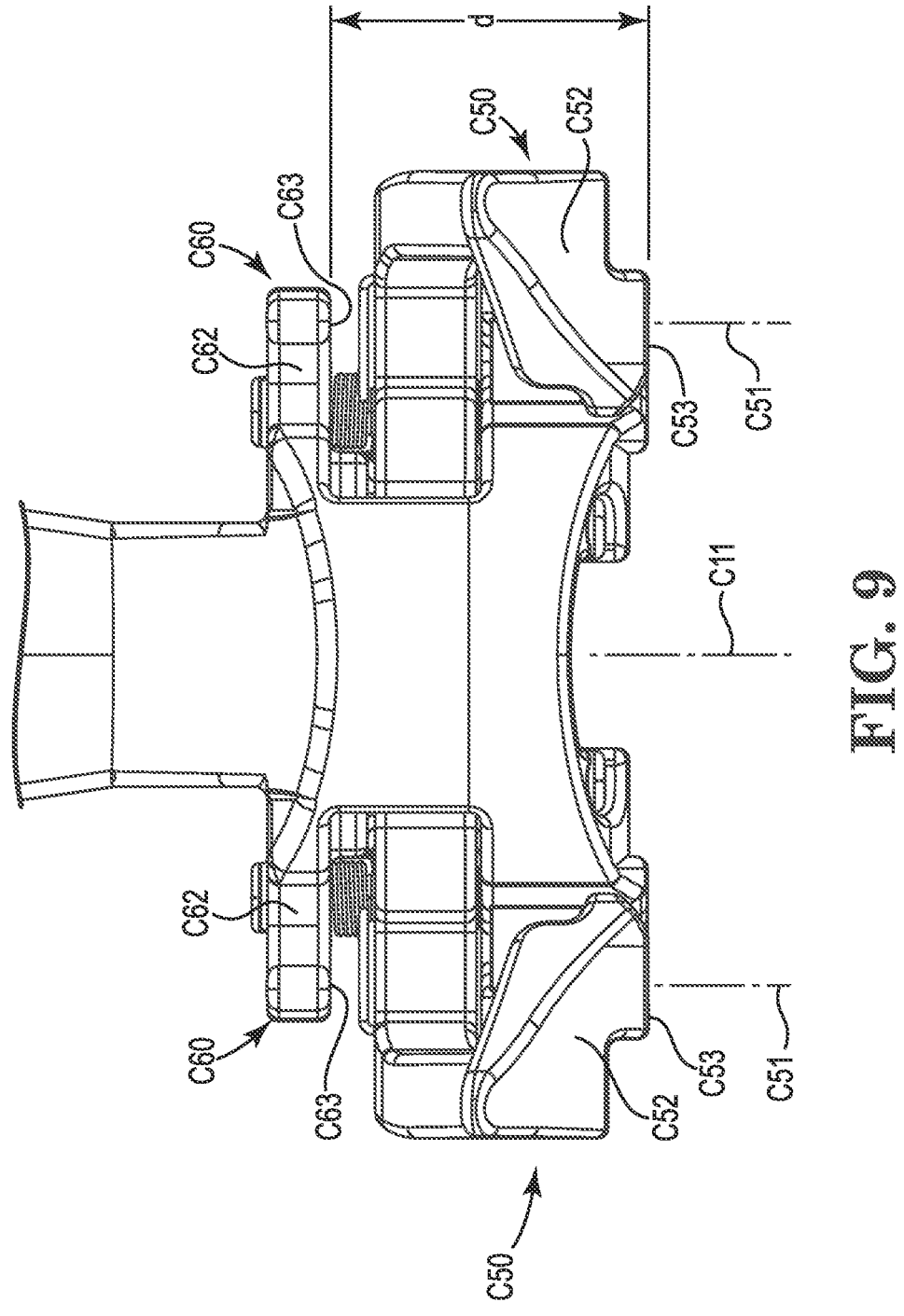
FIG. 9 is an enlarged view of the shank guides and shank clamps of the poultry cradle of FIG. 6.

Spacing between the inferior/distal/bottom side C53 of the shank clamps C50 and the inferior/distal/bottom side C63 of the shank guides C60 may be helpful for larger birds. With reference to FIG. 9, the spacing d (along axes C51) between the inferior/distal/bottom side C63 of the shank clamp C50 from the inferior/distal/bottom side C63 of the shank guide C60 may improve control over the shank of a duck or a turkey hatchling that would otherwise not be available in the absence of a shank guide and/or if the shank guide and the shank clamp were located closer to each other.

In one or more embodiments, the distance between an inferior/distal/bottom side C53 of the shank clamp C50 and the inferior/distal/bottom side C63 of the shank guide C60 along a longitudinal (superior/inferior) axis C11 extending through the head support C70 and the torso support C40 is, at a lower end, 5 millimeters or more, 1 centimeter or more, or 2 centimeters or more.

In one or more embodiments, the distance between an inferior/distal/bottom side C53 of the shank clamp C50 and the inferior/distal/bottom side C63 of the shank guide C60 along a longitudinal (superior/inferior) axis C11 extending through the head support C70 and the torso support C40 is, at an upper end, 3 centimeters or less, 2 centimeters or less, or 1 centimeter or less.

In one or more embodiments, the shank clamps C50 may include arms C52 that move between open configurations in which the shanks of a bird can be positioned in the shank clamps C50 and closed configurations in which the shanks of the bird are retained in the shank clamps C50. Although the depicted shank clamps C50 include arms C52, other structures (such as, e.g., inflatable bladders, etc.) may be used to retain a bird's shanks in the shank clamps when the clamps C50 are in the closed configuration.

The shank clamps C50 may be normally closed but constructed such that they open in response to the forces generated as a shank is being inserted into the shank clamp C50 (the shank clamps C50 may be, e.g., spring-loaded, etc.). In other embodiments, the shank clamps C50 may have defined open and closed configurations between which the clamps can be moved to accept and/or retain a shank of a bird being restrained. In one or more embodiments, the arms C52 of the shank clamps may rotate about clamp axes C51 when moving between the open and closed configurations.

The poultry cradles C10 may also include a head support C70 operably attached to the torso support C40 and positioned to support the head of a bird located in the poultry cradle C10. The head support C70 includes a first side facing the head of a bird retained in the poultry cradle C10. The head support C70 may preferably include a beak receiving passage C72 extending through the head support C70 to an opening C73 on the second side of the head support C70. In one or more embodiments, the beak receiving passage C72 preferably extends through the head support C70 such that at least a portion of the beak of a bird retained in the poultry cradle C10 extends through the opening C73 of the beak receiving passage C72 and is exposed proximate the second surface of the head support C70 (where the second side of the head support C70 faces away from the head of a bird retained in the poultry cradle C10).

The head support C70 may include head clamps C74 movable between an open configuration and a closed configuration. In the open configuration, the head clamp C74 is preferably positioned such that the head of a bird can be positioned in the head support C70 with the beak preferably extending through the beak receiving passage C72 and preferably protruding from the opening C73 on the second side of the head support C70. In the closed configuration, the head clamps C74 preferably function to retain the head of a bird in the head support C70 such that its beak extends into the beak receiving passage C72 and preferably protrudes through the opening C73 on the second side of the head support. The head clamps C74 may rotate about head clamp axes C71 when moving between their open and closed configurations.

Structures similar to the head support C70 and clamps C74 may be described in, e.g., U.S. Pat. No. 5,651,731 titled METHOD AND APPARATUS FOR DEBEAKING POULTRY; U.S. Pat. No. 7,232,450 titled APPARATUS AND METHOD FOR UPPER AND LOWER BEAK TREATMENT; U.S. Patent Application Publication US 2005/0101937 A1 titled APPARATUS AND METHOD FOR NASAL DELIVERY OF COMPOSITIONS TO BIRDS; U.S. Pat. No. 7,363,881 titled BEAK TREATMENT WITH TONGUE PROTECTION; etc. Another illustrative embodiment of a head clamp used with a head holder in a poultry cradle includes the keeper apparatus described in U.S. Pat. No. 9,808,328 (POULTRY CARRIERS AND METHODS OF RESTRAINING POULTRY). Other examples of suitable structures for head clamps are also possible.

As noted above, the rear-facing poultry claw system 10 is depicted in FIGS. 4 and 5 with bird B restrained in the poultry cradle C10 located in a selected position relative to the rear-facing poultry claw system 10. The seat lift 20 of system 10 is located in its ready position, toe control bar 30 is in its retracted position, and claw sensor 40 is located in its home position as described above in connection with rear-facing poultry claw system 10.

Figure 10:
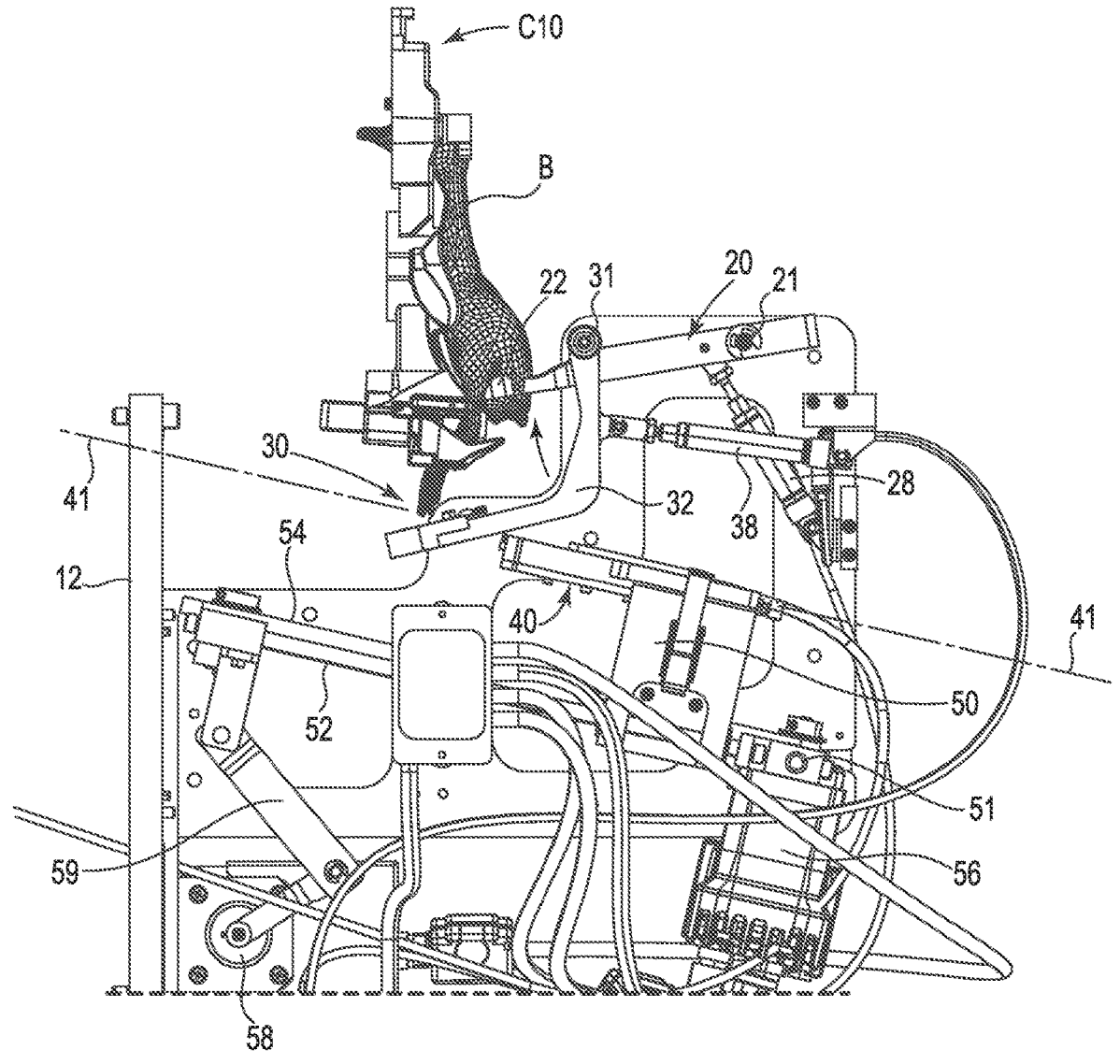
FIG. 10 depicts the poultry detection system of FIG. 4 after movement of a seat lift to act on the bird restrained in the poultry cradle.

Referring to FIG. 10, the seat lift 20 is moved from its ready position to its lift position where it acts on the seat of the bird B to raise the seat of the bird B causing the shanks of the bird B to move upward. For purposes of the present invention, the seat of the bird is located proximate the cloaca or vent of the bird and is located to allow for positioning of a bird B in a poultry cradle as described herein. Movement of the seat lift 20 to its lift position raises the shanks of the bird B such that the distal/inferior ends of the shanks of the bird B are moved to a location just below the inferior/distal/bottom sides C53 of the shank clamps C50. As a result, the forward-facing toes and the rear-facing toes (and their claws) on the shanks of the bird B are positioned in known locations relative to the remainder of the rear-facing poultry claw system 10.

In the depicted illustrative embodiment of rear-facing poultry claw system 10, movement of the seat lift 20 from its ready position to its lift position is accomplished using seat lift actuator 28. In particular, seat lift actuator 28 is extended which rotates the seat lift 20 about lift axis 21 from its ready position to its lift position. That rotation of seat lift 20 causes the lift end 22 to contact and raise the bird B restrained in the poultry cradle C10. As noted above, movement of the bird by seat lift 20 positions the shanks and the forward-facing toes of the bird in a known location relative to the remainder of the rear-facing poultry claw system 10.

Figure 11:
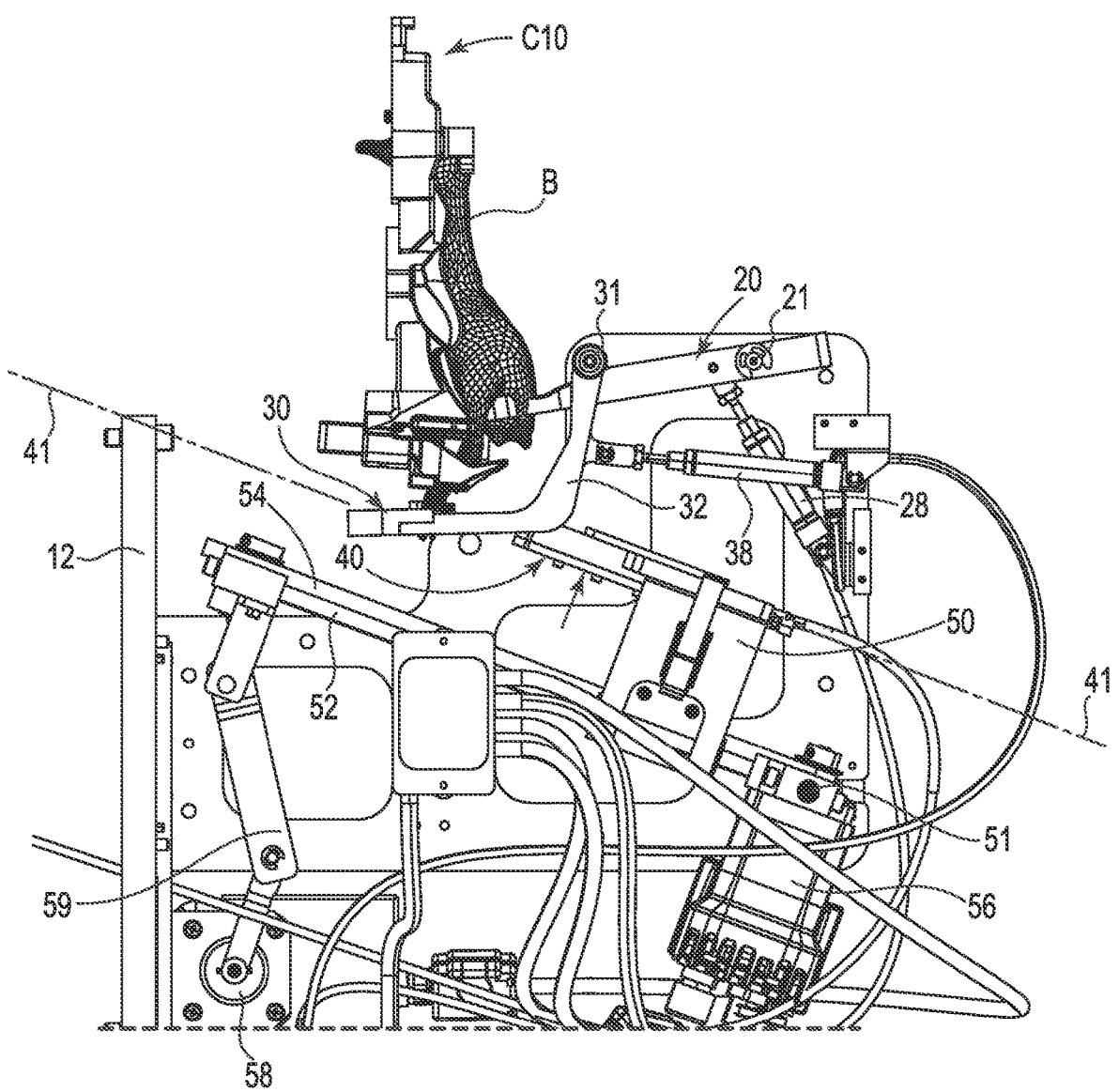
FIG. 11 depicts the rear-facing poultry claw system of FIG. 10 after movement of the toe control bar to a control position and movement of a sensor track to a sensing position from the base position as depicted in FIG. 10.

After actuation of the seat lift 20 to raise the bird B in the poultry cradle C10 as discussed in connection with FIG. 10 such that the forward-facing toes are positioned in known locations, the toe control bar 30 (and its toe platform 34) can be moved from its retracted position to its control position to raise the forward-facing toes of the bird B as seen in FIG. 11. Raising the forward-facing toes of the bird B while restraining the shanks of the bird B typically causes the rear-facing toes on the shanks of the bird B to extend away from the shank to make detection of the claws on those rear-facing toes easier. In addition, extension of those rear-facing toes may also provide benefits in inspection and or processing of the claws on those rear-facing toes as compared to the claws on rear-facing toes that are located closer to the shanks of the bird B.

In addition to movement of the toe control bar 30 from its retracted position to its control position as seen in one change from FIG. 10 to FIG. 11, the depicted illustrative embodiment of the sensor track/rail assembly 52 is also moved from its base position as seen in FIG. 10 to its sensing position in FIG. 11. Movement of the sensor track/rail assembly 52 to its sensing position as seen in FIG. 11 involves, in the depicted illustrative embodiment, rotating the sensor track/rail assembly about track axis 51. Movement of the sensor track/rail assembly 52 to its sensing position as seen in FIG. 11 also raises the carriage 50 and claw sensor 40 located on sensor track/rail assembly 52 as seen in FIG. 11.

Figure 12:
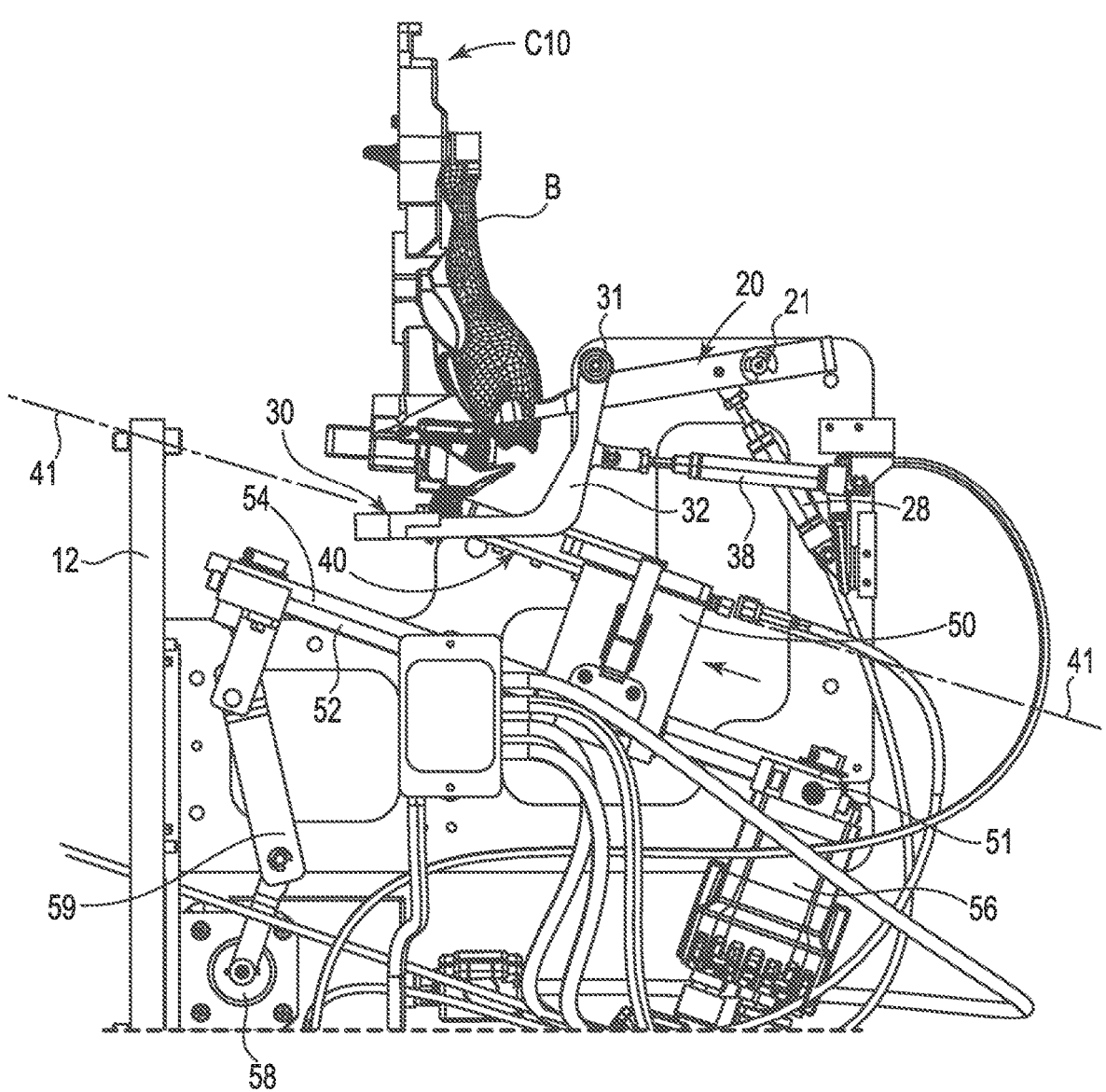
FIG. 12 depicts the rear-facing poultry claw system of FIG. 11 after movement of the claw sensor to a forward position from a home position as seen in FIG. 11.
Figure 13:
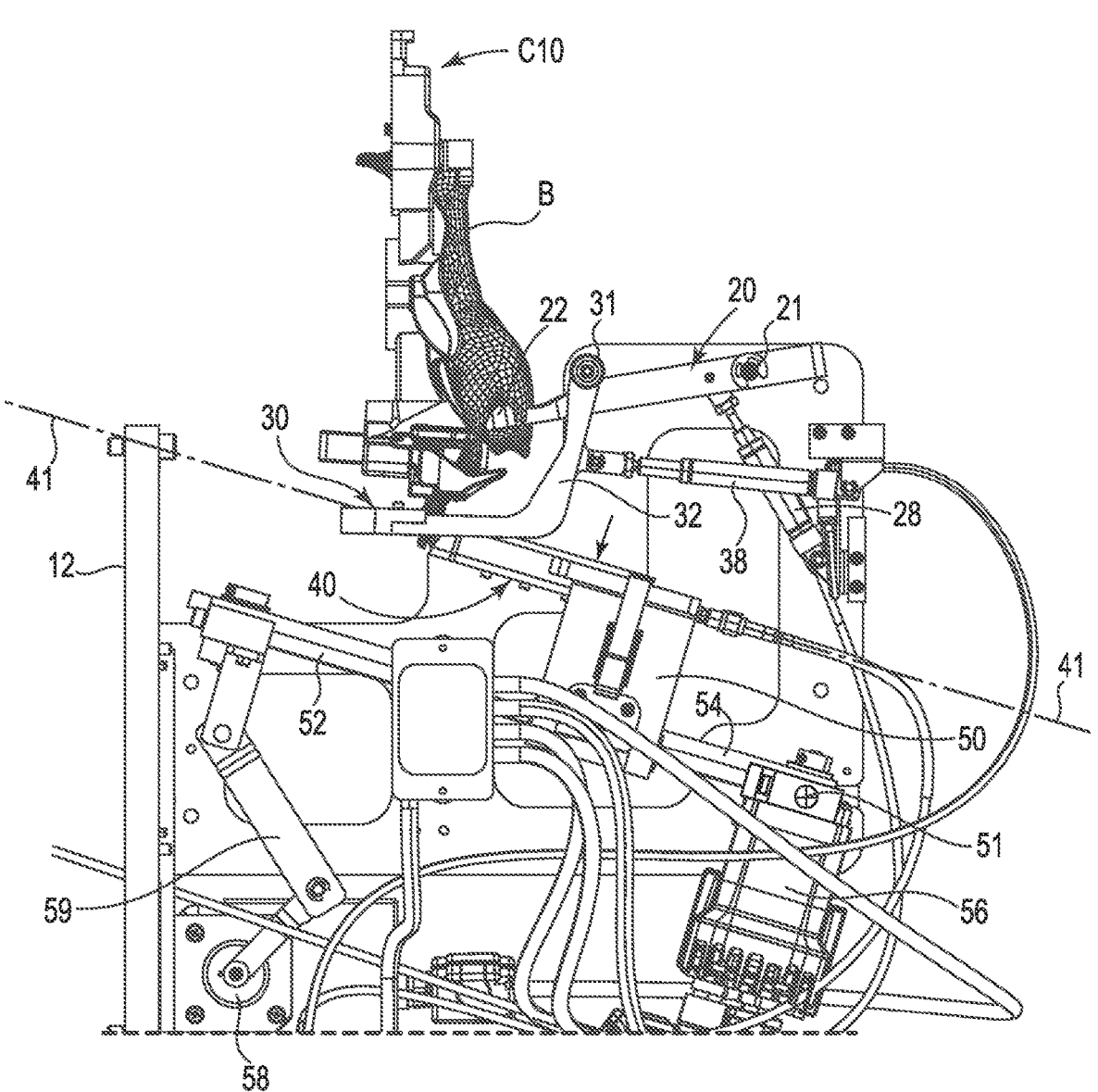
FIG. 13 depicts the rear-facing poultry claw system of FIG. 12 after movement of the sensor track to a finish position from the sensing position as seen in FIG. 12.
Figure 14:
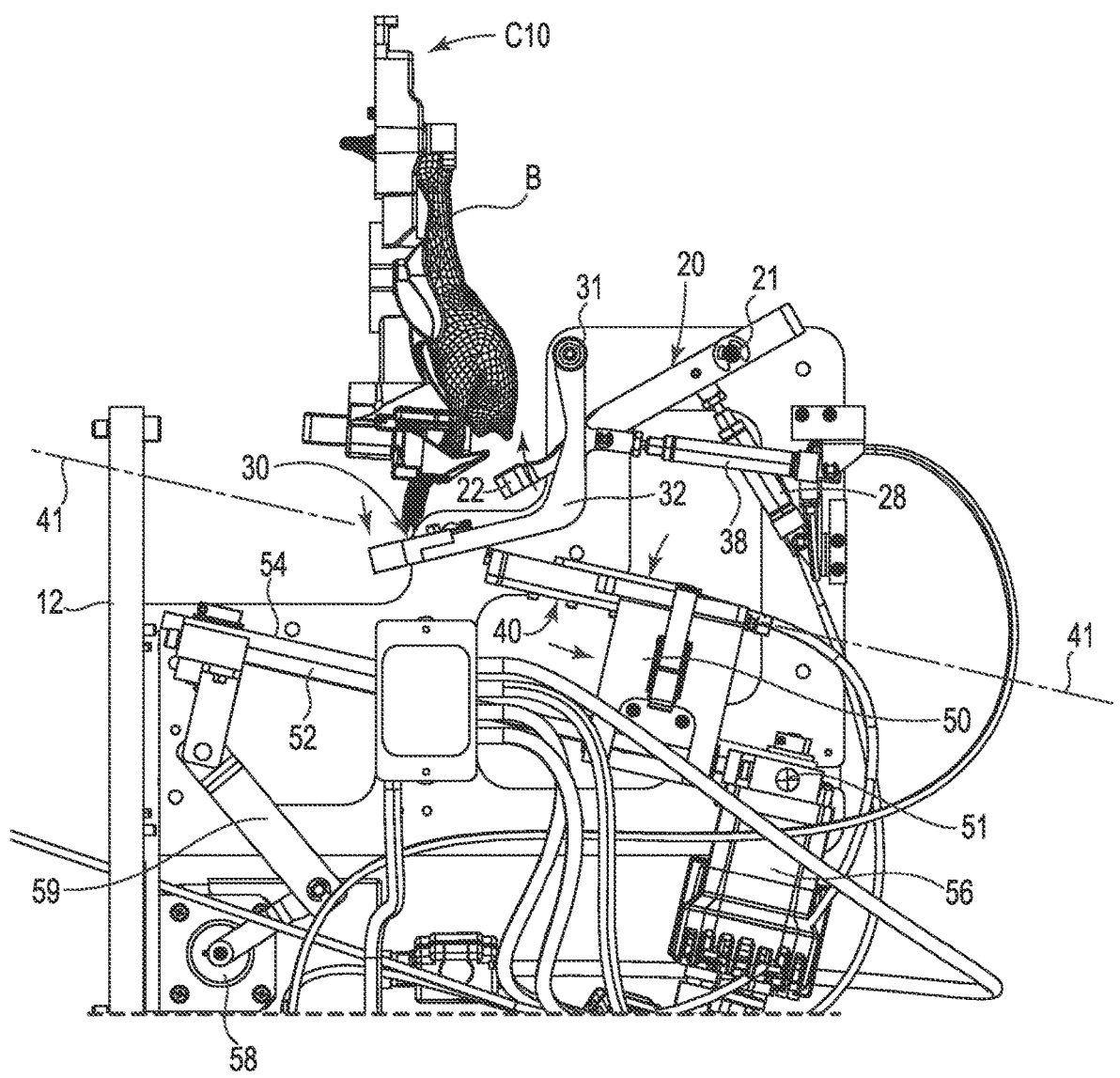
FIG. 14 depicts the rear-facing poultry claw system of FIG. 13 after movement of the sensor track to its base position, movement of the toe control bar to its retracted position, movement of the claw sensor to its home position on the sensor track, and movement of the seat lift away from the bird restrained in the poultry cradle.

With reference to FIG. 12, the claw sensor 40 is moved along the sensing axis 41 from its home position on sensor track/rail assembly 52 as seen in FIG. 11 to its forward position as seen in FIG. 12. With the claw sensor 40 in its forward position on the sensor track/rail assembly 52 and the sensor track/rail assembly 52 in its sensing position, the detection apparatus on claw sensor 40 is preferably positioned proximate the shanks of the bird B at a location below the shank clamps C50 of the poultry cradle C10 and at or above the rear-facing toes on the shanks of the bird B.

With the claw sensor 40 in its forward position and sensor track/rail assembly 52 in its sensing position, the track actuator (including motor assembly 58 and drive link 59 in the depicted embodiment) can be operated to move the sensor track/rail assembly 52 and claw sensor 40 located thereon away from the poultry cradle C10 while operating the detection apparatus on the claw sensor 40 to detect the claws on the rear-facing toes on the shanks of the bird B. In essence, the detection apparatus of the claw sensor 40 (in one illustrative embodiment) scans the rear-facing toes thereon to detect the claws at the distal ends of the rear-facing toes when the sensor track is moved from the sensing position to the finish position. The finish position will correspond to a location at which the detection apparatus on the claw sensor 40 detects the claws at the distal ends of the rear-facing toes. In those instances in which the claws on the rear-facing toes on the left and right shanks are located at different distances from the sensing axis 41, the system may be configured to position the claw sensor at a midpoint between the relative positions of the claws on the left and right rear-facing toes.

In the depicted illustrative embodiment, the forward position of the claw sensor 40 in one or more embodiments of the rear-facing poultry claw systems described herein may be variable between each bird, with the exact forward position being based on detection of one or more anatomical features (e.g., the shanks, rear-facing toes, and/or claws) of each bird. In such embodiments, the specific forward position may be based on, e.g., detection of the shanks, rear-facing toes, and/or claws by the detection apparatus on the claw sensor 40.

In one or more alternative embodiments of rear-facing poultry claw systems described herein, the claw sensor 40 may be positioned at a selected forward position, in other words, the system does not move the claw sensor 40 to the selected forward position based on detection of any anatomical features of a specific bird. Any such selected forward position may be chosen based on, e.g., one or more anatomical characteristics of a selected set of birds, e.g., birds of a given flock being processed.

The finish position of the sensor track/rail assembly in the depicted illustrative embodiment of the rear-facing poultry claw system may, like the forward position of the claw sensor 40, also be variable between each bird, with the exact finish position being based on detection of one or more anatomical features of each bird. In such embodiments, the specific finish position may be based on, e.g., detection of the claws on the rear-facing toes by the detection apparatus on the claw sensor 40. In one or more alternative embodiments of rear-facing poultry claw systems described herein, the sensor track/rail assembly 52 may be positioned at a selected sensing/finish position, in other words, the system does not move the sensor track/rail assembly 52 to the selected sensing/finish position based on detection of the claws at the distal ends of rear-facing toes of birds. Any such selected sensing/finishing position may be chosen based on, e.g., one or more anatomical characteristics of a selected set of birds, e.g., birds of a given flock being processed.

After positioning of the claw sensor 40 and the sensor track/rail assembly 52 as described herein, any selected activity or activities such as, e.g., inspections, processing, etc. of the claws on the rear-facing toes can be performed. At the completion of those activities, with the claw sensor 40 in forward position along the sensing axis 41 and the sensor track/rail assembly 52 in its finish position as seen in FIG. 13, the components of the rear-facing poultry claw systems described herein can be returned to their respective "ready" positions. Those changes can be seen in FIG. 14 where the seat lift 20 is returned to its ready position from its lift position as seen in FIG. 13, the toe control bar 30 is returned to its retracted position from its control position as seen in FIG. 13, the claw sensor 40 is returned to its home position along sensing axis 41 on sensor track/rail assembly 52 from its forward position as seen in FIG. 13, and the sensor track/rail assembly 52 is returned to its base position from its finish position as seen in FIG. 13. With the components of the rear-facing poultry claw system returned to their ready positions, the bird B in the poultry cradle C10 can be moved out of the selected position relative to the system frame.

One illustrative embodiment of claw sensor 40 seen in connection with the illustrative embodiments of rear-facing poultry claw system described herein is depicted in enlarged views in FIGS. 15-16 after removing the claw sensor 40 from the carriage 50 of the illustrative embodiments of rear-facing poultry claw systems described herein. The depicted illustrative embodiment of claw sensor 40 contains a pair of detectors 70 carried in a housing 42 that includes a cover plate 43 attached to the housing 42. For reference, the sensing axis 41 is also depicted in FIGS. 15-16.

The detectors 70 of the depicted embodiment of claw sensor 40 are arranged and configured to be positioned proximate the rear-facing toes on the shanks of a bird B restrained in a poultry carrier located in a selected position with respect to the system frame of a rear-facing poultry claw system as described herein. Although the depicted illustrative embodiment of claw sensor 40 includes a pair of detectors 70 configured to be simultaneously located proximate the left and right shanks of a bird B in a poultry carrier as described herein, one or more alternative embodiments of claw sensors that may be used in rear-facing poultry claw systems described herein may include only one detector configured to detect the claw on the rear-facing toe on only one shank of a bird. In embodiments such as that seen in, e.g., FIGS. 15-16, the two detectors 70 are provided to simultaneously detect claws on the rear-facing toes on both the left and right shank of a bird.

In one or more embodiments, the detectors 70 of the depicted illustrative embodiment of toe sensor 40 may be adapted to both detect and, optionally, deliver energy to the claws on the rear-facing toes using the systems described herein. For example, the detectors 70 of the claw sensor 40 may function as applicators that are configured to establish radio frequency (RF) electric fields that can be used for either or both the detection of poultry claws and selective delivery of RF energy to the claws on the rear-facing toes of birds after detection. In one or more embodiments, the energy delivered to the rear-facing claws on birds as described herein may be sufficient to retard growth of the rear-facing claws.

Some illustrative systems and methods in which RF energy delivered through applicators is used in connection with the detection and/or delivery growth-retarding levels/amounts of energy to claws of birds is described in, e.g., International Publication No. WO 2019/236964 titled ENERGY DELIVERY SYSTEM USING AN ELECTRIC FIELD (Gorans et al.) (claiming priority to U.S. Provisional Patent Application No. 62/682,262 filed on 8 Jun. 2018). In those embodiments of claw sensor 40 in which the detector 70 functions as an applicator to deliver RF energy as part of the detection process, the housing 42 or cover plate 43 of the claw sensor 40 may function as a ground for energy being delivered through the detectors 70.

Figure 17:
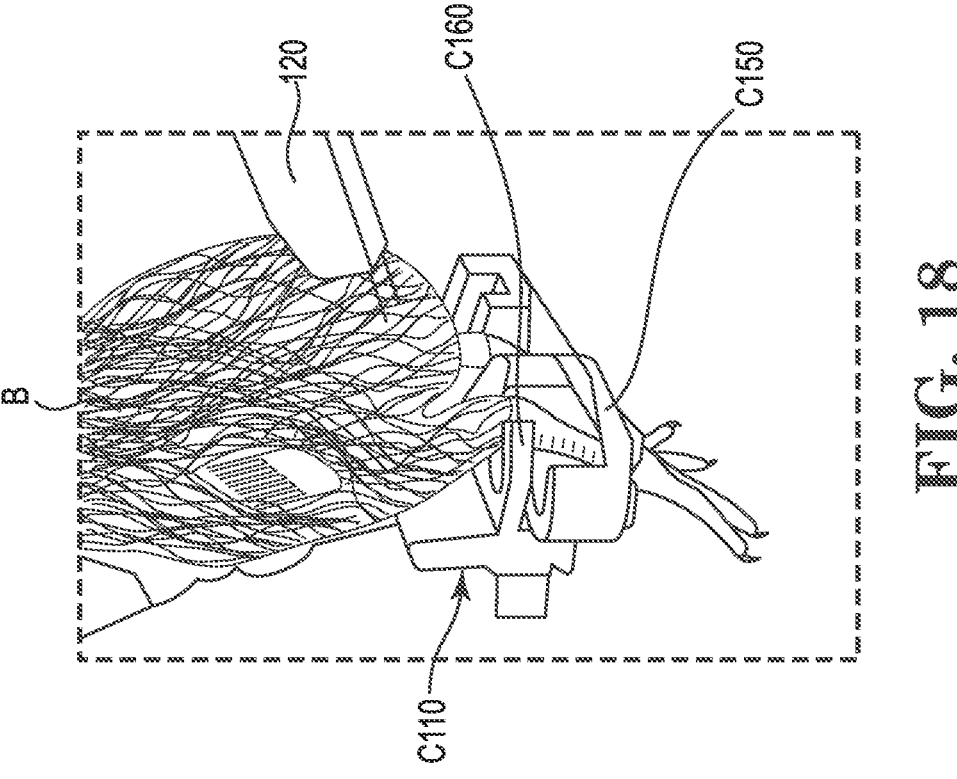
FIG. 17 depicts a portion of another illustrative embodiment of a bird restrained in a poultry cradle in a selected position relative to a rear-facing poultry claw system as described herein before movement of a seat lift to act on the bird restrained in the poultry cradle.

FIGS. 17-21 depict another illustrative embodiment of a rear-facing poultry claw system as described herein in use. In particular, FIG. 17 depicts a bird B restrained in a poultry cradle C110 in a selected position relative to the system. The left shank of the bird B is located in the shank clamp C150 and the shank guide C160. The system depicted in FIG. 17 includes a seat lift 120 in its ready position before movement of the seat lift 120 to act on the bird B restrained in the poultry cradle C110.

Figure 18:
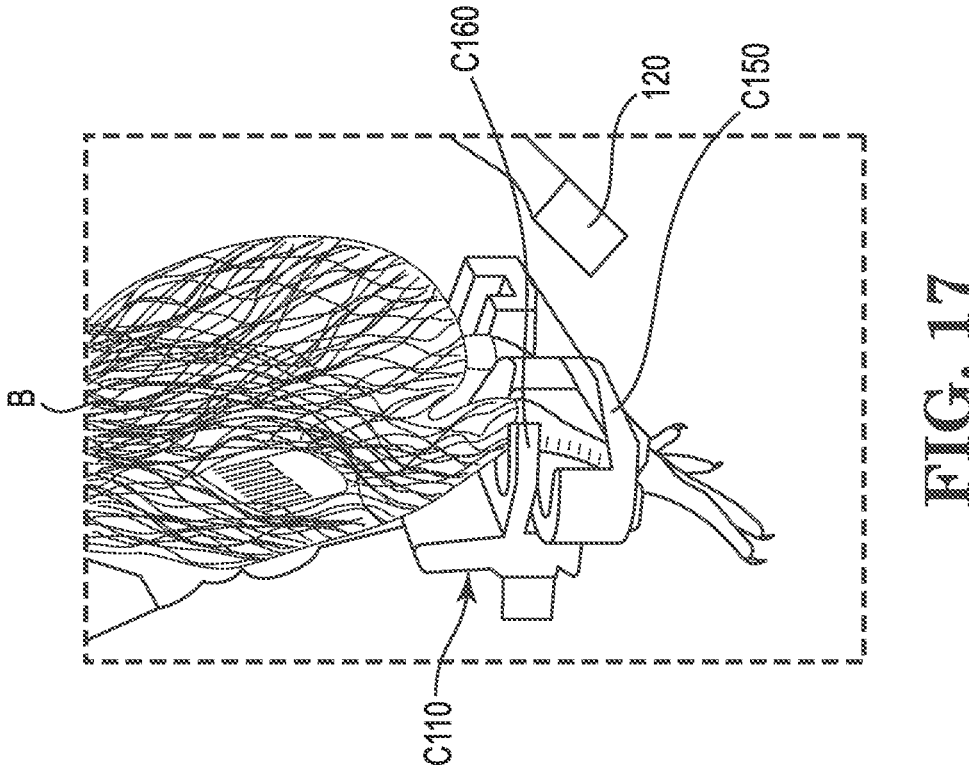
FIG. 18 depicts the poultry cradle and seat lift of FIG. 17 after movement of the seat lift to act on the bird restrained in the poultry cradle.

FIG. 18 depicts the rear-facing poultry claw system of FIG. 17 after movement of the seat lift 120 from its ready position to its lift position in which the seat lift 120 acts on the bird B restrained in the poultry cradle C110. As described herein, movement of the seat lift 120 from its ready position to its lift position as depicted in FIG. 18 causes the shanks of the bird B to move upward such that the forward-facing toes of the bird B and the distal/inferior ends of the shanks of the bird B are moved to a location just below the inferior/distal/bottom sides of the shank clamps C150 of poultry cradle C110. As a result, the forward-facing toes and the rear-facing toes on the shanks of the bird B are positioned in known locations relative to the remainder of the rear-facing poultry claw system.

Figure 19:
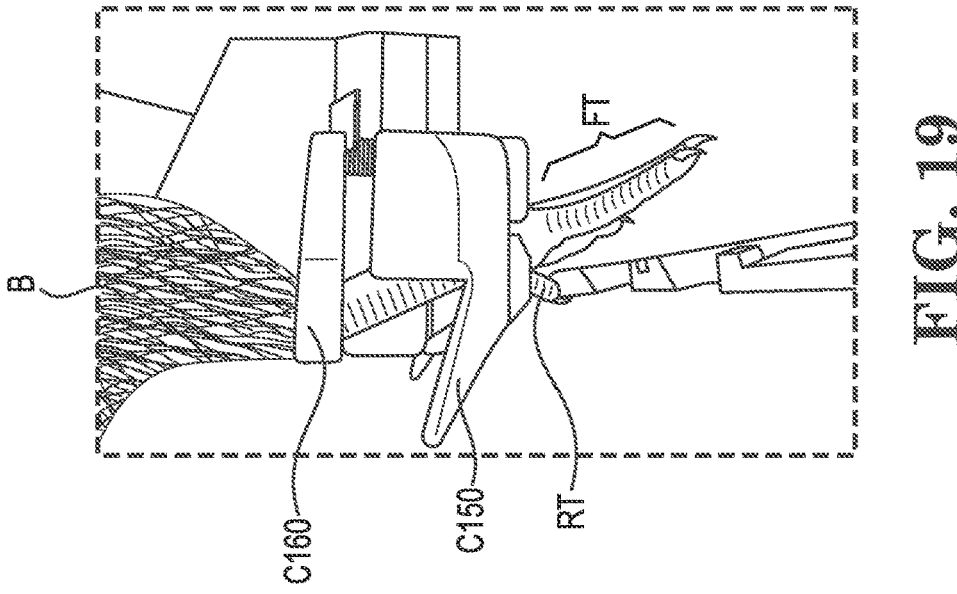
FIG. 19 depicts one illustrative embodiment of a rear-facing poultry claw system as described herein with the poultry cradle of FIG. 18 in a selected position with respect to the system and the illustrative embodiment of a toe control bar of the system in its retracted position.

FIG. 19 depicts the illustrative embodiment of rear-facing poultry claw system with the bird B in the poultry cradle of FIG. 18 in a selected position with respect to the system (and the seat lift 120 in its lift position) and a toe control bar 130 in its retracted position within the system (and relative to the bird B in the poultry cradle C110). The forward-facing toes FT and the rear-facing toe RT of the bird B are also depicted in FIG. 19.

Figure 20:
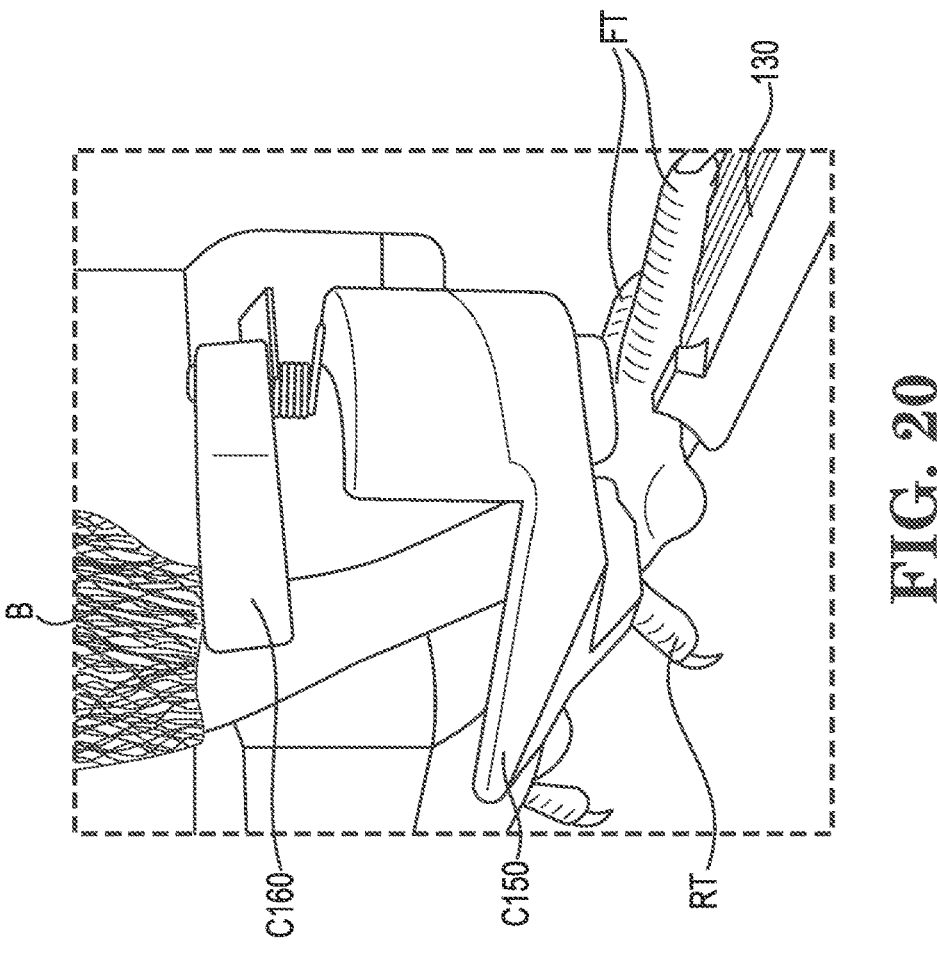
FIG. 20 depicts the forward-facing toes and the rear-facing toe on the right shank of the bird in the poultry cradle of FIG. 19 after the toe control bar has been moved to its control position to raise the forward-facing toes of the bird.

FIG. 20 depicts the forward-facing toes FT and the rear-facing toe RT on the right shank of the bird in the poultry cradle C110 of FIG. 19 after the toe control bar 130 has been moved to its control position to raise the forward-facing toes FT of the bird B towards the poultry cradle C110. As discussed herein, movement of the forward-facing toes FT by the toe control bar 130 preferably causes the rear-facing toe RT on the shank to extend away from the shank.

Movement of the forward-facing toes FT by the toe control bar 130 may also/alternatively simply move the forward-facing toes FT away from the rear-facing toe RT to enhance detection of the rear-facing toe RT.

Figure 21:
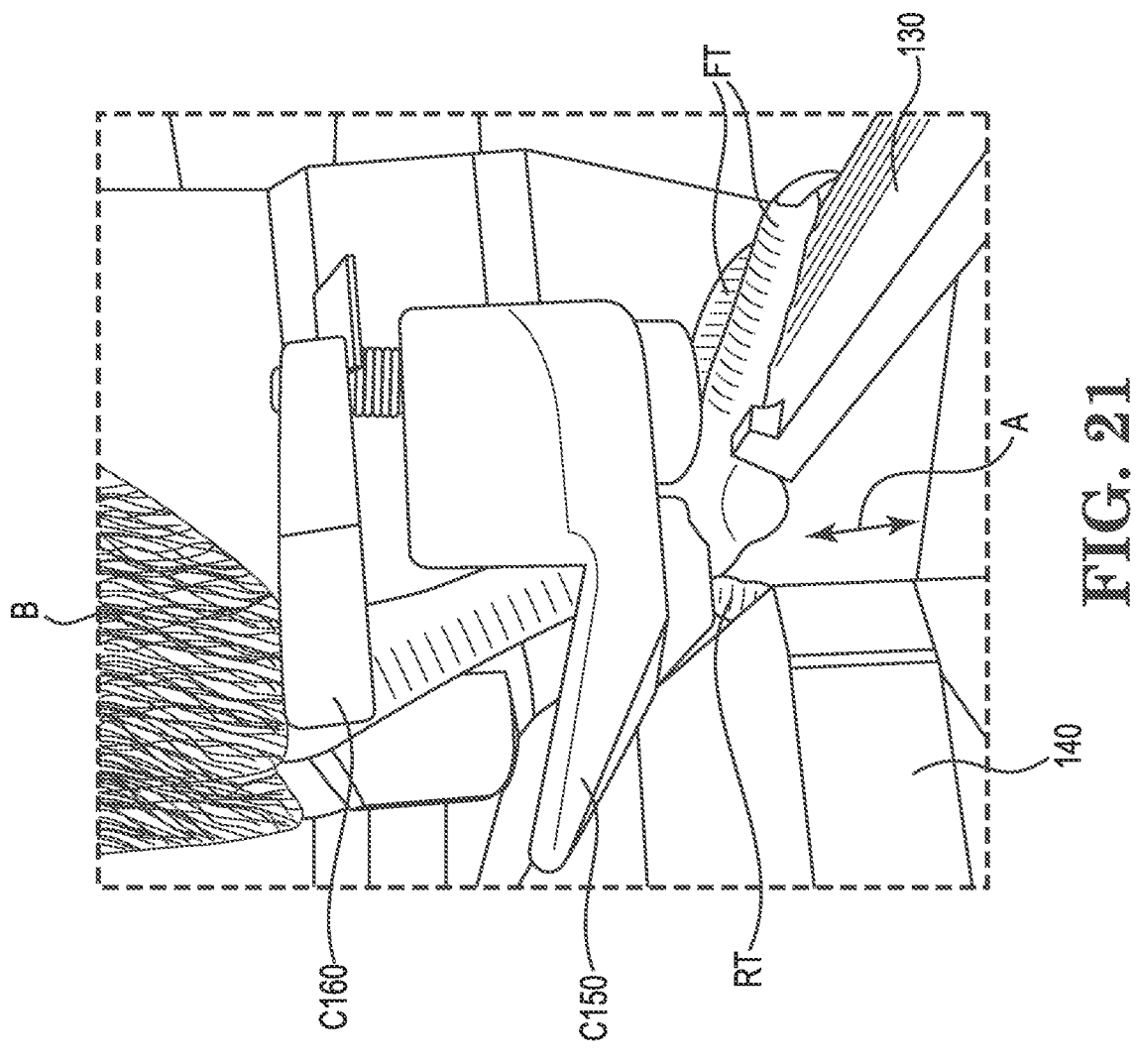
FIG. 21 depicts the forward-facing toes and the rear-facing toe on the right shank of the bird in the poultry cradle of FIG. 20 after the claw sensor in its forward position to position the detection apparatus of claw sensor proximate the shank of the bird B.

With the forward-facing toes FT moved by the toe control bar 130 and the rear-facing toe RT on the shank extending away from the shank as seen in FIG. 20, the claw sensor 140 can be moved to its forward position as depicted in FIG. 21. In addition, positioning the claw sensor 140 as seen in FIG. 21 may also involve moving the sensor track/rail assembly (not shown) on which the claw sensor 140 is located from its base position to its sensing position.

Movement of the claw sensor 140 and the sensor track/rail assembly to position the claw sensor 140 as depicted in FIG. 21 may involve, as described herein, movement of the claw sensor 140 to a selected forward position or to a forward position that varies based on detection of one or more anatomical features of the bird B.

Similarly, movement of the sensor track/rail assembly carrying the claw sensor 140 to the position depicted in FIG. 21 may involve, as described herein, movement of the sensor track/rail assembly carrying claw sensor 140 to a selected sensing/finish position or from a sensing position to a finish position that varies based on detection of one or more anatomical features of the bird B. In one or more embodiments of the rear-facing poultry claw systems described herein in which the finish position varies, the claw sensor 140 and the sensor track/rail assembly may be moved to their respective forward position and sensing position to position the detection apparatus on the claw sensor 140 at a location on or above/proximal the rear-facing toe RT.

With the claw sensor 140 in its forward position and the sensor track/rail assembly in its sensing position, the sensor track/rail assembly can be moved along the directions indicated by bidirectional arrow A in FIG. 21 to a location at which the detection apparatus of the claw sensor detects the claws on the rear-facing toes RT of the bird B. In one or more embodiments, the system may be configured to position the claw sensor 140 (and the detection apparatus thereon) at a midpoint between the relative detected positions of the claws on the left and right rear-facing toes RT on the left and right shanks of the bird B.

Figure 22:
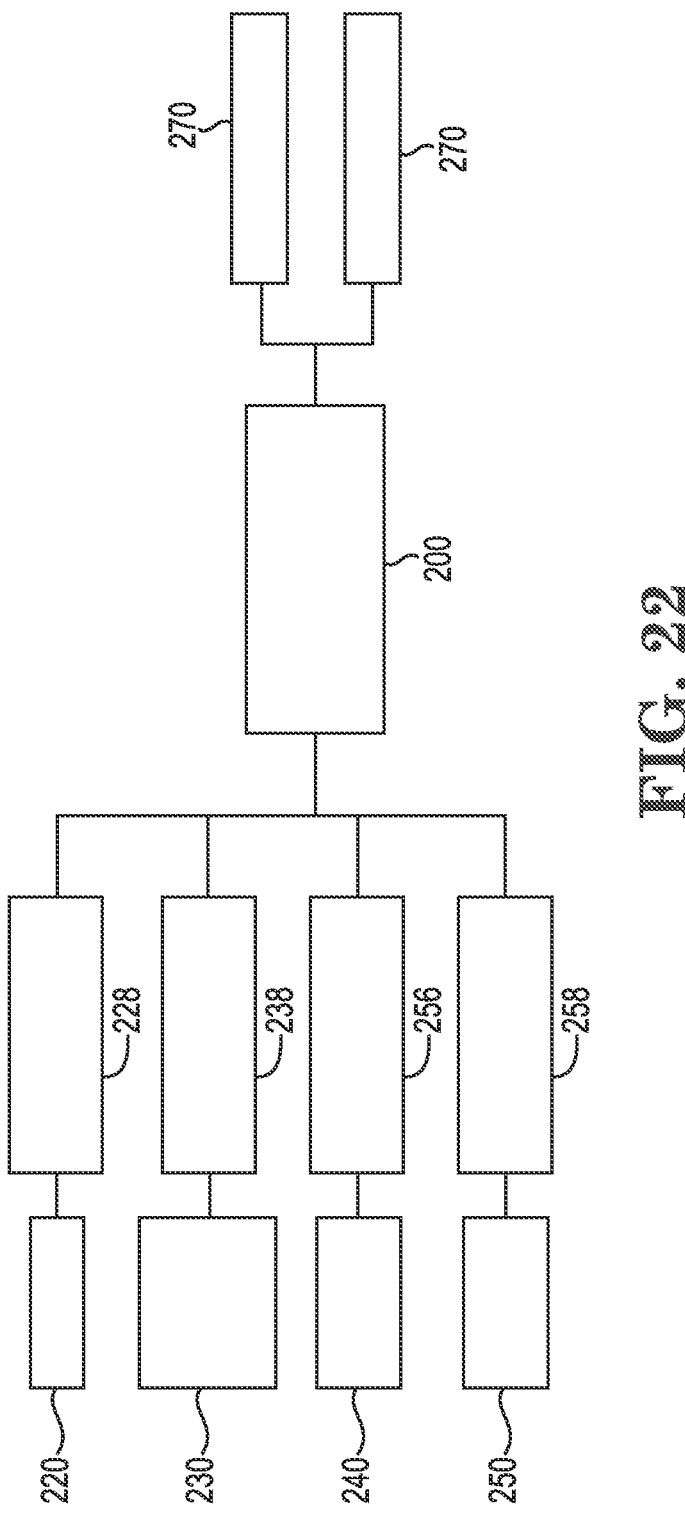
FIG. 22 is a schematic diagram of components in one illustrative embodiment of a rear-facing poultry claw system as described herein.

FIG. 22 is a schematic diagram of components in one illustrative embodiment of a rear-facing poultry claw system as described herein. The depicted system includes a controller 200 operably connected to a seat lift actuator 228, a control bar actuator 238, a claw sensor actuator 256, and a track actuator 258.

The seat lift actuator 228 is operably connected to a seat lift 220 of the rear-facing poultry claw systems described herein. As described herein, the seat lift actuator 228 is used to move the seat lift 220 between its ready and lift positions.

The control bar actuator 238 is operably connected to a toe control bar 230 of the rear-facing poultry claw systems described herein. As described herein, the control bar actuator is used to move the toe control bar 230 between its retracted and control positions.

The claw sensor actuator 256 is operably connected to a claw sensor 240 of the rear-facing poultry claw systems described herein. As described herein, the claw sensor actuator 256 is used to move the claw sensor 240 between its home and forward positions along a sensing axis.

The track actuator 258 is operably connected to a sensor track 250 along which the claw sensor 240 of the rear-facing poultry claw systems described herein moves. As described herein, the track actuator 258 is used to move the sensor track 250 between its base, sensing, and finish positions to assist in detection of the claws on the rear-facing toes of a bird.

The controller 200 may be provided in any suitable form and may, for example, include memory and a controller. The controller may, for example, be in the form of one or more microprocessors, Field-Programmable Gate Arrays (FPGA), Digital Signal Processors (DSP), microcontrollers, Application Specific Integrated Circuit (ASIC) state machines, etc. The controllers may include one or more of any suitable input devices configured to allow a user to operate the poultry toe and claw systems described herein (e.g., keyboards, touchscreens, mice, trackballs, etc.), as well as display devices configured to convey information to a user (e.g., monitors (which may or may not be touchscreens), indicator lights, etc.). Although not depicted separately, the controller 200 may incorporate a pneumatic and/or hydraulic control system in those systems in which one or more of the actuators use pneumatic and/or hydraulic components.

The illustrative embodiment of the rear-facing poultry claw system depicted in FIG. 22 also includes a pair of detectors 270 designated for the anatomical features (e.g., rear-facing toes and/or claws on the rear-facing toes) on the left and right shanks of birds processed in the depicted system.

The controller 200 may include optionally integrated controllers capable of operating the detectors 270 as needed to detect anatomical features such as, e.g., the claws on rear-facing toes of birds as described herein. As a result, controller 200 may include components capable of detecting claws as described herein using RF energy, optical energy, vision systems, capacitive detection systems, etc. In those embodiments in which RF energy is used, reference may be had to International Publication No. WO 2019/236964 titled ENERGY DELIVERY SYSTEM USING AN ELECTRIC FIELD (Gorans et al.) for a discussion of the components, circuitry, techniques, etc. used in the detection and, optionally, processing of poultry claws as described therein.

Figure 23:
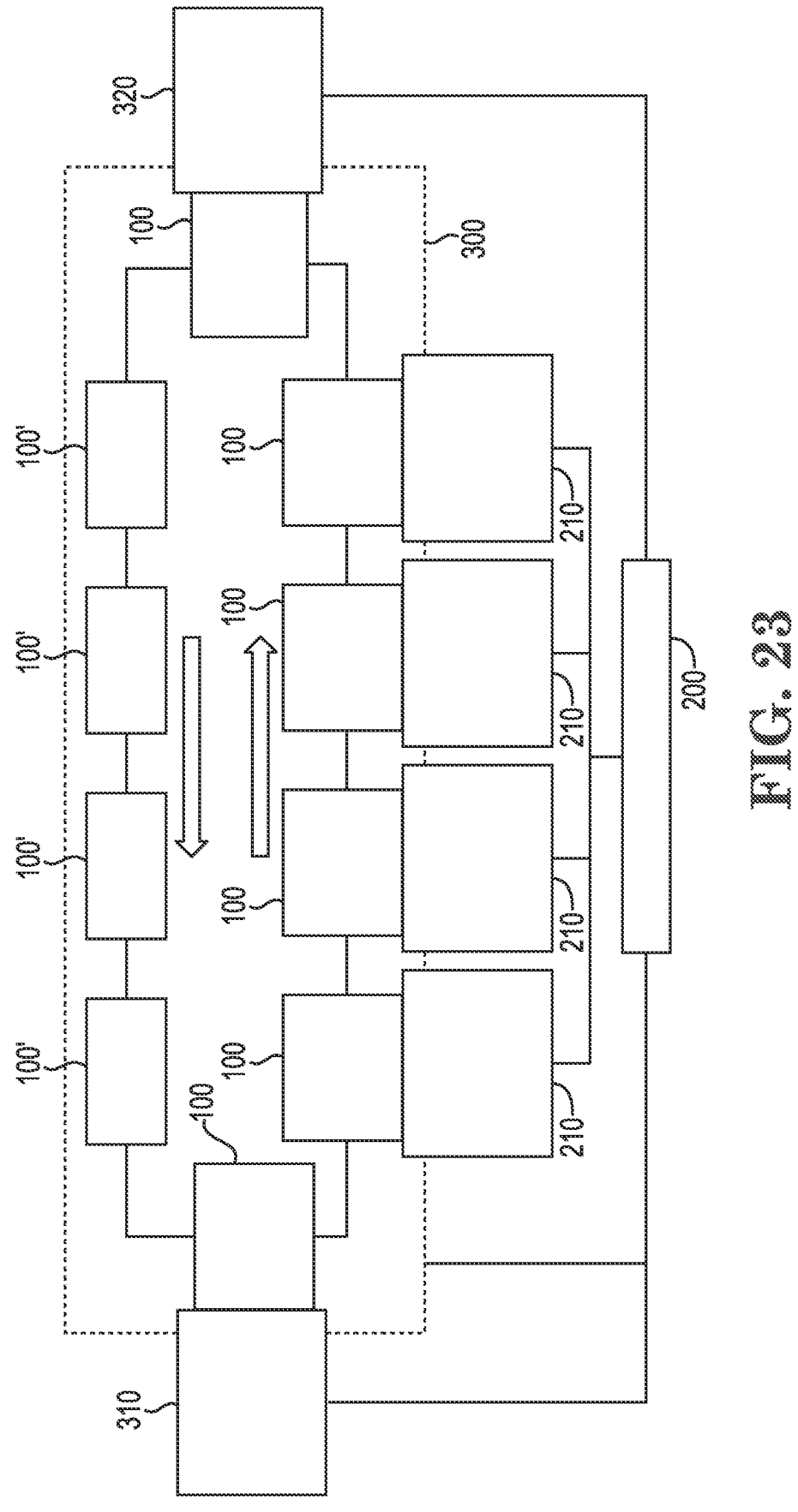
FIG. 23 is a schematic diagram of one illustrative embodiment of a system as described herein that includes multiple poultry cradles, a loading station, and unloading station, and one illustrative embodiment of a rear-facing poultry claw system along with locations for one or more additional stations.

FIG. 23 is a schematic diagram of one illustrative embodiment of a system as described herein that includes multiple poultry cradles, a loading station, and unloading station, and one illustrative embodiment of a rear-facing poultry claw system along with locations for one or more additional stations in the depicted system. Some illustrative examples of such systems may be described in, e.g., U.S. Pat. No. 7,066,112, titled AUTOMATED POULTRY PROCESSING METHOD AND SYSTEM.

The illustrative embodiment of the processing system depicted in FIG. 23 includes a controller 200 operably connected to stations 210 at which various processes can be performed on a bird located in a poultry cradle at the selected station 210. The system includes a series of poultry cradles 100 and 100' configured to move between the stations 210 using conveying system 300, as well as between a loading station 310 and an unload station 320. Birds are loaded into each poultry cradle 100' at the loading station 310 where they are conveyed to the stations 210 using conveying system 300 where selected processes can be performed on the birds located in the loaded poultry cradles 100. In particular, the station designated "REAR CLAW STATION" may be one embodiment of a rear-facing poultry claw system as described herein.

After processing at one or more of the stations 210, the loaded poultry cradles 100 are conveyed using conveying system 300 to the unload station 310 where a bird restrained in the loaded poultry cradle 100 is released, with the unloaded poultry cradle 100' moving away from the unload station for reloading at the loading station 310.

Although only rear-facing poultry claw systems are described herein, stations 210 may include beak processing/inspection stations, injection stations, stations for processing the forward-facing phalanges II, III, and IV (located distal/below/inferior on the shank), gender identification stations, nutrient delivery stations, etc.

Nonlimiting examples of processes and/or processing stations that may be used in one or more embodiments of the systems described herein may be described in, for example, U.S. Pat. No. 5,195,925 (METHOD AND APPARATUS FOR DECLAWING POULTRY); U.S. Pat. No. 5,651,731 (METHOD AND APPARATUS FOR DEBEAKING POULTRY); U.S. Pat. No. 7,232,450 (APPARATUS AND METHOD FOR UPPER AND LOWER BEAK TREATMENT); U.S. Pat. No. 8,499,721 (APPARATUS AND METHOD FOR NASAL DELIVERY OF COMPOSITIONS TO BIRDS); U.S. Pat. No. 7,363,881 (BEAK TREATMENT WITH TONGUE PROTECTION); U.S. Pat. No. 9,775,695 (FOURTH TOE PROCESSING SYSTEMS AND METHODS); US Patent Application Publication US 2019/0133734 (POULTRY INJECTION APPARATUS WITH ROTATING CAPTURE MEMBERS AND METHODS OF USE); International Publication WO 2018204572 (INJECTION SYSTEMS AND METHODS); International Publication WO 2019236964 (ENERGY DELIVERY SYSTEM USING AN ELECTRIC FIELD); US Patent Application Publication 2021/0068937 (MATERIAL DELIVERY SYSTEMS, BEAK OPENING APPARATUS AND METHODS OF USE); etc.

In one or more embodiments, poultry cradles that may be used in connection with the systems described herein may be described in U.S. Provisional Application titled POULTRY CRADLES AND METHODS OF RESTRAINING POULTRY filed on even date herewith in the name of Applicant Nova-Tech Engineering, LLC (U.S. Provisional Application No. 63/273,430, filed Oct. 29, 2021.

In one or more embodiments, one or more of the processing stations may be in the form of a forward-facing poultry claw positioning and/or processing system as described in described in the U.S. Provisional Application titled POULTRY TOE AND CLAW POSITIONING SYSTEM AND METHOD filed on even date herewith in the name of Applicant Nova-Tech Engineering, LLC (U.S. Provisional Application No. 63/273,414, filed Oct. 29, 2021). In one or more embodiments, one or more of the processing stations may be in the form of a poultry beak processing and/or masking system as described in described in the U.S. Provisional Application titled POULTRY BEAK PROCESSING SYSTEM AND METHOD filed on even date herewith in the name of Applicant Nova-Tech Engineering, LLC (U.S. Provisional Application No. 63/273,438, filed Oct. 29, 2021).

All references and publications cited herein are expressly incorporated herein by reference in their entirety into this disclosure, except to the extent they may directly contradict this disclosure. Although specific illustrative embodiments have been described herein, it will be appreciated by those of ordinary skill in the art that a variety of alternate and/or equivalent implementations can be substituted for the specific embodiments shown and described without departing from the scope of the present disclosure. It should be understood that this disclosure is not intended to be unduly limited by the illustrative embodiments and examples set forth herein and that such examples and embodiments are presented by way of example only with the scope of the disclosure intended to be limited only by the claims.

What is claimed is:

1. A rear-facing poultry claw system comprising:
   a toe control bar operably attached to a system frame, the toe control bar configured to move between a retracted position and a control position;
   a control bar actuator operably connected to the toe control bar, the control bar actuator configured to raise and lower the toe control bar between the retracted position and the control position;
   a seat lift operably attached to the system frame, the seat lift configured to move between a ready position and a lift position, along a lift axis;
   a seat lift actuator operably connected to the seat lift, the seat lift actuator configured to rotate the seat lift about the lift axis to move the seat lift between the ready position and the lift position; and
   a controller operably connected to the seat lift actuator and the control bar actuator, wherein the controller is configured to:
      operate the seat lift actuator such that the seat lift actuator moves the seat lift from the ready position to the lift position, and
      operate the control bar actuator such that the control bar actuator raises es the toe control bar from the retracted position to the control position after operating the seat lift actuator to rotate the seat lift from the ready position to the lift position.

2. A system according to claim 1, wherein the system comprises:
   a claw sensor configured to detect a claw of a rear-facing toe on a shank of a bird;
   a sensor track operably attached to the system frame, the sensor track defining a sensing axis, wherein the claw sensor is mounted on the sensor track and configured to move along the sensing axis between a home position and a forward position, wherein the claw sensor is closer to the toe control bar in the forward position than the home position; and
   a claw sensor actuator operably connected to the claw sensor, the claw sensor actuator configured to move the claw sensor along the sensing axis between the home position and the forward position;
   and wherein the controller is operably attached to the claw sensor actuator, the controller configured to operate the claw sensor actuator such that the claw sensor actuator moves the claw sensor along the sensing axis from the home position to the forward position after operating the control bar actuator to move the toe control bar from the retracted position to the control position.

3. A system according to claim 2, wherein the system further comprises a track actuator operably attached to the sensor track, wherein the track actuator is configured to move the sensor track between a base position and a sensing position, and wherein the controller is operably connected to the track actuator, the controller being configured to operate the track actuator such that the track actuator moves the sensor track from the base position to the sensing position after operating the control bar actuator to move the toe control bar from the retracted position to the control position.

4. A system according to claim 3, wherein the track actuator is configured to rotate the sensor track about a track axis when moving the sensor track between the base position and the sensing position.

5. A system according to claim 4, wherein the lift axis is offset from one or both of the control bar axis and the track axis.

6. A system according to claim 3, wherein the track actuator is configured to move the sensor track between the sensing position and a finish position, wherein the controller is configured to operate the track actuator such that the sensor track actuator moves the sensor track from the sensing position to the finish position after moving the sensor track to the sensing position.

7. A system according to claim 3, wherein the claw sensor is selected from an RF electric field generator/sensor, a capacitive sensor, and an optical detector.

8. A system according to claim 1, wherein the toe control bar is configured to rotate about a control bar axis when moving between the retracted position and the control position.

9. A system according to claim 8, wherein the lift axis is offset from the control bar axis.

10. A system according to claim 1, wherein the system comprises a poultry cradle located in a selected position relative to the system frame, wherein the poultry cradle is configured to restrain a bird such that the seat lift acts on a seat of the bird when the poultry cradle is in the selected position and the seat lift is in the lift position.

11. A rear-facing poultry claw system comprising:
   a toe control bar operably attached to the system frame, the toe control bar configured to move between a retracted position and a control position;
   a control bar actuator operably connected to the toe control bar, the control bar actuator configured to move the toe control bar between the retracted position and the control position, wherein the toe control bar is configured to rotate about a control bar axis when moving between the retracted position and the control position;
   a seat lift operably attached to the system frame, the seat lift configured to move between a ready position and a lift position;
   a seat lift actuator operably connected to the seat lift, the seat lift actuator configured to move the seat lift between the ready position and the lift position; and
   a controller operably connected to the seat lift actuator and the control bar actuator, wherein the controller is configured to:
      operate the seat lift actuator such that the seat lift actuator moves the seat lift from the ready position to the lift position, and
      operate the control bar actuator such that the control bar actuator moves the toe control bar from the retracted position to the control position after operating the seat lift actuator to move the seat lift from the ready position to the lift position.

12. A system according to claim 11, wherein the system comprises:
   a claw sensor configured to detect a claw of a rear-facing toe on a shank of a bird;
   a sensor track operably attached to the system frame, the sensor track defining a sensing axis, wherein the claw sensor is mounted on the sensor track and configured to move along the sensing axis between a home position and a forward position, wherein the claw sensor is closer to the toe control bar in the forward position than the home position; and
   a claw sensor actuator operably connected to the claw sensor, the claw sensor actuator configured to move the claw sensor along the sensing axis between the home position and the forward position;

and wherein the controller is operably attached to the claw sensor actuator, the controller configured to operate the claw sensor actuator such that the claw sensor actuator moves the claw sensor along the sensing axis from the home position to the forward position after operating the control bar actuator to move the toe control bar from the retracted position to the control position.

13. A system according to claim 12, wherein the system further comprises a track actuator operably attached to the sensor track, wherein the track actuator is configured to move the sensor track between a base position and a sensing position, and wherein the controller is operably connected to the track actuator, the controller being configured to operate the track actuator such that the track actuator moves the sensor track from the base position to the sensing position after operating the control bar actuator to move the toe control bar from the retracted position to the control position.

14. A system according to claim 13, wherein the track actuator is configured to rotate the sensor track about a track axis when moving the sensor track between the base position and the sensing position.

15. A system according to claim 14, wherein a lift axis is offset from one or both of the control bar axis and the track axis.

16. A system according to claim 13, wherein the track actuator is configured to move the sensor track between the sensing position and a finish position, wherein the controller is configured to operate the track actuator such that the sensor track actuator moves the sensor track from the sensing position to the finish position after moving the sensor track to the sensing position.

17. A system according to claim 12, wherein the claw sensor is selected from an RF electric field generator/sensor, a capacitive sensor, and an optical detector.

18. A system according to claim 12, wherein the system comprises a poultry cradle located in a selected position relative to the system frame, wherein the poultry cradle is configured to restrain a bird such that the seat lift acts on a seat of the bird when the poultry cradle is in the selected position and the seat lift is in the lift position.

19. A rear-facing poultry claw system comprising:
a toe control bar operably attached to the system frame, the toe control bar configured to move between a retracted position and a control position;
a control bar actuator operably connected to the toe control bar, the control bar actuator configured to move the toe control bar between the retracted position and the control position;
a seat lift operably attached to the system frame, the seat lift configured to move between a ready position and a lift position;
a seat lift actuator operably connected to the seat lift, the seat lift actuator configured to move the seat lift between the ready position and the lift position;
a poultry cradle located in a selected position relative to the system frame, wherein the poultry cradle is configured to restrain a bird such that the seat lift acts on a seat of the bird when the poultry cradle is in the selected position and the seat lift is in the lift position; and a controller operably connected to the seat lift actuator and the control bar actuator, wherein the controller is configured to:
operate the seat lift actuator such that the seat lift actuator moves the seat lift from the ready position to the lift position, and
operate the control bar actuator such that the control bar actuator moves the toe control bar from the retracted position to the control position after operating the seat lift actuator to move the seat lift from the ready position to the lift position.

20. A system according to claim 19, wherein the system comprises:
a claw sensor configured to detect a claw of a rear-facing toe on a shank of a bird;
a sensor track operably attached to the system frame, the sensor track defining a sensing axis, wherein the claw sensor is mounted on the sensor track and configured to move along the sensing axis between a home position and a forward position, wherein the claw sensor is closer to the toe control bar in the forward position than the home position; and
a claw sensor actuator operably connected to the claw sensor, the claw sensor actuator configured to move the claw sensor along the sensing axis between the home position and the forward position;
and wherein the controller is operably attached to the claw sensor actuator, the controller configured to operate the claw sensor actuator such that the claw sensor actuator moves the claw sensor along the sensing axis from the home position to the forward position after operating the control bar actuator to move the toe control bar from the retracted position to the control position.

21. A system according to claim 20, wherein the system further comprises a track actuator operably attached to the sensor track, wherein the track actuator is configured to move the sensor track between a base position and a sensing position, and wherein the controller is operably connected to the track actuator, the controller being configured to operate the track actuator such that the track actuator moves the sensor track from the base position to the sensing position after operating the control bar actuator to move the toe control bar from the retracted position to the control position.

22. A system according to claim 21, wherein the track actuator is configured to rotate the sensor track about a track axis when moving the sensor track between the base position and the sensing position.

23. A system according to claim 22, wherein a lift axis is offset from one or both of the control bar axis and the track axis.

24. A system according to claim 21, wherein the track actuator is configured to move the sensor track between the sensing position and a finish position, wherein the controller is configured to operate the track actuator such that the sensor track actuator moves the sensor track from the sensing position to the finish position after moving the sensor track to the sensing position.

25. A system according to claim 20, wherein the claw sensor is selected from an RF electric field generator/sensor, a capacitive sensor, and an optical detector.

* * * * *